United States Patent
Prasad et al.

(10) Patent No.: US 12,506,518 B2
(45) Date of Patent: Dec. 23, 2025

(54) PARAMETERIZED CODEBOOKS FOR RECONFIGURABLE INTELLIGENT SURFACE-ASSISTED COMMUNICATIONS

(71) Applicant: QUALCOMM Incorporated, San Diego, CA (US)

(72) Inventors: Narayan Prasad, Westfield, NJ (US); Yu-Chin Ou, San Diego, CA (US); Mohammad Ali Tassoudji, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 18/340,626

(22) Filed: Jun. 23, 2023

(65) Prior Publication Data

US 2024/0429972 A1 Dec. 26, 2024

(51) Int. Cl.
*H04B 7/04* (2017.01)
*H04B 7/0456* (2017.01)

(52) U.S. Cl.
CPC ....... *H04B 7/04026* (2023.05); *H04B 7/0456* (2013.01)

(58) Field of Classification Search
CPC .............. H04B 7/04026; H04B 7/0456; H04B 7/04013
See application file for complete search history.

(56) References Cited

U.S. PATENT DOCUMENTS

| | | | |
|---|---|---|---|
| 2023/0033266 A1* | 2/2023 | Lee | H04B 7/06952 |
| 2023/0379913 A1* | 11/2023 | Kim | H04L 5/0053 |
| 2024/0097745 A1* | 3/2024 | Meyer | H01Q 3/36 |
| 2024/0275433 A1* | 8/2024 | Li | H04B 17/391 |

FOREIGN PATENT DOCUMENTS

WO    WO-2022217421 A1    10/2022

OTHER PUBLICATIONS

International Search Report and Written Opinion—PCT/US2024/034053—ISA/EPO—Dec. 9, 2024.
Partial International Search Report—PCT/US2024/034053—ISA/EPO—Oct. 18, 2024.

* cited by examiner

*Primary Examiner* — Tejis Daya
(74) *Attorney, Agent, or Firm* — Holland & Hart LLP/Qualcomm

(57) ABSTRACT

Methods, systems, and devices for wireless communications are described. A network entity may utilize parameterized codebooks to support reconfigurable intelligent surface (RIS)-assisted communications. For example, a network entity may receive an indication of one or more codebooks associated with respective sets of parameters including one or more of a respective field of view (FOV) or a respective configuration switching latency, among other parameters. The network entity may select a codebook for RIS-assisted communications based on whether the codebook satisfies one or more thresholds. The network entity may indicate the codebook to a RIS controller and may communicate one or more messages with a user equipment (UE) using a RIS in accordance with the indicated codebook.

30 Claims, 15 Drawing Sheets

PARAMETERIZED CODEBOOKS FOR RECONFIGURABLE INTELLIGENT SURFACE-ASSISTED COMMUNICATIONS

FIELD OF TECHNOLOGY

The following relates to wireless communications, including parameterized codebooks for reconfigurable intelligent surface (RIS)-assisted communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

A network entity in a wireless multi-access communications systems may communicate information with a UE using a reconfigurable intelligent surface (RIS). A RIS may include reflecting or refracting elements operable to redirect incident signals from the network entity toward the UE, and vice versa.

SUMMARY

The described techniques relate to improved methods, systems, devices, and apparatuses that support parameterized codebooks for reconfigurable intelligent surface (RIS)-assisted communications. For example, the described techniques provide for a network entity to indicate, to a RIS controller coupled with (e.g., included in) a RIS, a codebook parameterized by various parameters including one or more of a field of view (FOV), a gain metric associated with the FOV, and a configuration switching speed associated with using the codebook for communication using a RIS, among other parameters. The network entity may receive an indication of a set of parameterized codebooks and may choose a parameterized codebook suitable for communications performed by the network entity (e.g., traffic conditions, channel conditions, a coverage area associated with the network entity). The network entity may indicate the chosen parameterized codebook to a RIS controller and use the indicated parameterized codebook for communications using a RIS, such as for communicating messages with a user equipment (UE) via the RIS.

Additionally, or alternatively, the network entity may perform a handshake procedure with the RIS controller to identify a suitable parameterized codebook. For example, the network entity may indicate a set of parameters associated with a desired codebook to the RIS controller. The RIS controller may determine a parameterized codebook that is realizable by the RIS controller while attempting to satisfy the indicated set of parameters and may indicate the parameterized codebook to the network entity. In response, the network entity may determine whether the parameterized codebook satisfies one or more thresholds (e.g., whether the codebook is suitable) and may indicate updated parameters to the RIS controller based on which the RIS controller may determine a second parameterized codebook realizable by the RIS controller (e.g., if the codebook is unsuitable) or indicate for the RIS controller to use the indicated codebook to support the network entity communications using the RIS.

A method for wireless communications by a network entity is described. The method may include receiving a first indication of a set of codebooks associated with communication using a RIS, the first indication indicating a respective set of parameters associated with each codebook of the set of codebooks including at least one of a respective FOV associated with the codebook or a respective duration to switch between using different codewords of the codebook, transmitting, to a controller associated with the RIS, a second indication of a first codebook of the set of codebooks and a codeword of the first codebook based on a set of parameters associated with the first codebook, and communicating one or more messages using the RIS in accordance with the codeword.

An apparatus for wireless communication at a network entity is described. The apparatus may include one or more memories storing processor-executable code, and one or more processors coupled with the one or more memories. The one or more processors may be individually or collectively operable to execute the code to cause the apparatus to receive a first indication of a set of codebooks associated with communication using a RIS, the first indication indicating a respective set of parameters associated with each codebook of the set of codebooks including at least one of a respective FOV associated with the codebook or a respective duration to switch between using different codewords of the codebook, transmit, to a controller associated with the RIS, a second indication of a first codebook of the set of codebooks and a codeword of the first codebook based on a set of parameters associated with the first codebook, and communicate one or more messages using the RIS in accordance with the codeword.

Another apparatus for wireless communication at a network entity is described. The apparatus may include means for receiving a first indication of a set of codebooks associated with communication using a RIS, the first indication indicating a respective set of parameters associated with each codebook of the set of codebooks including at least one of a respective FOV associated with the codebook or a respective duration to switch between using different codewords of the codebook, means for transmitting, to a controller associated with the RIS, a second indication of a first codebook of the set of codebooks and a codeword of the first codebook based on a set of parameters associated with the first codebook, and means for communicating one or more messages using the RIS in accordance with the codeword.

A non-transitory computer-readable medium storing code for wireless communications at a network entity is described. The code may include instructions executable by one or more processors to receive a first indication of a set of codebooks associated with communication using a RIS, the first indication indicating a respective set of parameters associated with each codebook of the set of codebooks including at least one of a respective FOV associated with the codebook or a respective duration to switch between using different codewords of the codebook, transmit, to a controller associated with the RIS, a second indication of a first codebook of the set of codebooks and a codeword of the first codebook based on a set of parameters associated with the first codebook, and communicate one or more messages using the RIS in accordance with the codeword.

Some examples of the method, apparatuses, and non-transitory computer-readable medium described herein may further include operations, features, means, or instructions for selecting the first codebook from the set of codebooks based on the set of parameters satisfying one or more thresholds, where the set of parameters satisfying the one or more thresholds includes a FOV associated with the first codebook satisfying a threshold FOV, one or more gains associated with the FOV satisfying one or more threshold gains, a duration to switch between using different codewords of the first codebook satisfying a threshold duration, or a combination thereof, where the second indication may be transmitted based on the selecting.

In some examples of the method, apparatuses, and non-transitory computer-readable medium described herein, the one or more gains associated with the FOV include an average gain, a five-percentile gain, or a combination thereof.

In some examples of the method, apparatuses, and non-transitory computer-readable medium described herein, receiving the first indication of the set of codebooks may include operations, features, means, or instructions for receiving the first indication of the set of codebooks from an operations, administration, and maintenance (OAM) entity, a second network entity, or a controller associated with the RIS.

In some examples of the method, apparatuses, and non-transitory computer-readable medium described herein, the first indication of the set of codebooks includes a respective set of identifiers for each codebook of the set of codebooks, the respective set of identifiers including at least one of a first identifier indicating the respective FOV associated with the codebook, a second identifier indicating the respective duration to switch between using different codewords of the codebook, or a third identifier indicating a respective gain associated with the respective FOV.

In some examples of the method, apparatuses, and non-transitory computer-readable medium described herein, the set of codebooks corresponds to at least one of a first incident signal direction from the network entity to the RIS or a first distance between the network entity and the RIS and the set of codebooks may be different from a second set of codebooks that corresponds to at least one of a second incident signal direction from a second network entity to the RIS or a second distance between the second network entity and the RIS.

In some examples of the method, apparatuses, and non-transitory computer-readable medium described herein, the second indication may indicate a subset of codewords of the first codebook that includes the codeword, and communicating the one or more messages using the RIS may include operations, features, means, or instructions for transmitting, using the RIS, a set of synchronization signal blocks (SSBs) in accordance with the subset of codewords.

Some examples of the method, apparatuses, and non-transitory computer-readable medium described herein may further include operations, features, means, or instructions for receiving, from a UE, a report indicating a preferred SSB from the set of SSBs based on transmitting the set of SSBs and communicating one or more second messages with the UE using the RIS based on the report.

Some examples of the method, apparatuses, and non-transitory computer-readable medium described herein may further include operations, features, means, or instructions for classifying, based on the report, the UE for coverage by the network entity using the RIS, where the one or more second messages may be communicated with the UE based on the classifying.

In some examples of the method, apparatuses, and non-transitory computer-readable medium described herein, the first indication indicates the respective FOV associated with the codebook as an angular span including an azimuth and an elevation.

In some examples of the method, apparatuses, and non-transitory computer-readable medium described herein, the respective duration to switch between using different codewords of the codebook includes a maximum duration for the RIS to switch between using any two codewords of the codebook.

A method for wireless communications at a network entity is described. The method may include transmitting, to a controller associated with a RIS, a first indication of a first set of parameters associated with a first codebook for communication using the RIS and receiving, from the controller based at least in on part on transmitting the first indication, a second indication of a second codebook for the communication using the RIS, the second codebook associated with a second set of parameters that is based on the first set of parameters.

An apparatus for wireless communications at a network entity is described. The apparatus may include one or more memories storing processor-executable code, and one or more processors coupled with the one or more memories. The one or more processors may be individually or collectively operable to execute the code to cause the apparatus to transmit, to a controller associated with a RIS, a first indication of a first set of parameters associated with a first codebook for communication using the RIS and receive, from the controller based at least in on part on transmitting the first indication, a second indication of a second codebook for the communication using the RIS, the second codebook associated with a second set of parameters that is based on the first set of parameters.

Another apparatus for wireless communications at a network entity is described. The apparatus may include means for transmitting, to a controller associated with a RIS, a first indication of a first set of parameters associated with a first codebook for communication using the RIS and means for receiving, from the controller based at least in on part on transmitting the first indication, a second indication of a second codebook for the communication using the RIS, the second codebook associated with a second set of parameters that is based on the first set of parameters.

A non-transitory computer-readable medium storing code for wireless communications at a network entity is described. The code may include instructions executable by one or more processors to transmit, to a controller associated with a RIS, a first indication of a first set of parameters associated with a first codebook for communication using the RIS and receive, from the controller based at least in on part on transmitting the first indication, a second indication of a second codebook for the communication using the RIS, the second codebook associated with a second set of parameters that is based on the first set of parameters.

Some examples of the method, apparatuses, and non-transitory computer-readable medium described herein may further include operations, features, means, or instructions for transmitting, to the controller associated with the RIS, a third indication of the second codebook based on the second set of parameters associated with the second codebook satisfying one or more thresholds and communicating one or more messages using the RIS in accordance with the second codebook.

In some examples of the method, apparatuses, and non-transitory computer-readable medium described herein, the one or more thresholds may be based on one or more channel conditions associated with the network entity, traffic associated with the network entity, one or more user profiles associated with the network entity, or a combination thereof.

Some examples of the method, apparatuses, and non-transitory computer-readable medium described herein may further include operations, features, means, or instructions for transmitting, to the controller associated with the RIS, a third indication of a third set of parameters associated with a third codebook for the communication using the RIS based on the second set of parameters failing to satisfy one or more thresholds and receiving, from the controller based at least in on part on transmitting the third indication, a fourth indication of a fourth codebook for the communication using the RIS, the fourth codebook associated with a fourth set of parameters that may be based on the third set of parameters.

In some examples of the method, apparatuses, and non-transitory computer-readable medium described herein, the third set of parameters may include at least one of: a FOV associated with the third codebook; one or more gains associated with the FOV; a duration to switch between using different codewords of the third codebook; an incident signal direction from the network entity to the RIS; a distance between the network entity and the RIS; a quantity of codewords included in the third codebook; or a set of reflect or refract angles from the RIS to respective UEs and respective distance ranges associated with each angle of the set of angles, each respective distance range corresponding to one or more expected distances from the RIS to a UE at each angle.

Some examples of the method, apparatuses, and non-transitory computer-readable medium described herein may further include operations, features, means, or instructions for updating the first set of parameters to the third set of parameters based on the second set of parameters failing to satisfy the one or more thresholds, where the third indication may be transmitted based on the updating.

Some examples of the method, apparatuses, and non-transitory computer-readable medium described herein may further include operations, features, means, or instructions for adjusting a set of UEs associated with the communication using the RIS, where updating the first set of parameters to the third set of parameters may be based on the adjusting.

In some examples of the method, apparatuses, and non-transitory computer-readable medium described herein, the one or more thresholds may be based on one or more channel conditions associated with the network entity, traffic associated with the network entity, one or more user profiles associated with the network entity, or a combination thereof.

In some examples of the method, apparatuses, and non-transitory computer-readable medium described herein, the second indication indicates a set of codebooks for the communication using the RIS including the second codebook, each codebook of the set of codebooks associated with a respective set of parameters that may be based on the first set of parameters.

Some examples of the method, apparatuses, and non-transitory computer-readable medium described herein may further include operations, features, means, or instructions for selecting the second codebook based on the second set of parameters satisfying one or more thresholds, where the second set of parameters satisfying the one or more thresholds includes a FOV associated with the second codebook satisfying a threshold FOV, one or more gains associated with the FOV satisfying one or more threshold gains, a duration to switch between using different codewords of the second codebook satisfying a threshold duration, or a combination thereof, transmitting, to the controller associated with the RIS, a third indication of the second codebook and one or more codewords of the second codebook based on the selecting, and communicating one or more messages using the RIS in accordance with the one or more codewords.

In some examples of the method, apparatuses, and non-transitory computer-readable medium described herein, the first indication includes a request for the controller associated with the RIS to generate the second codebook based on the first set of parameters and receiving the second indication of the second codebook may be based on the request.

In some examples of the method, apparatuses, and non-transitory computer-readable medium described herein, the second indication of the second codebook includes a set of identifiers for the second codebook, the set of identifiers including at least one of a first identifier indicating a FOV associated with the second codebook, a second identifier indicating a duration to switch between using different codewords of the second codebook, or a third identifier indicating a gain associated with the FOV.

In some examples of the method, apparatuses, and non-transitory computer-readable medium described herein, the first set of parameters includes at least one of: a first FOV associated with the first codebook; one or more first gains associated with the first FOV; a first duration to switch between using different codewords of the first codebook; an incident signal direction from the network entity to the RIS; a distance between the network entity and the RIS; a first quantity of codewords included in the first codebook; or a set of reflect or refract angles from the RIS to respective UEs and respective distance ranges associated with each angle of the set of angles, each respective distance range corresponding to one or more expected distances from the RIS to a UE at each angle and the second set of parameters includes at least one of a second FOV associated with the second codebook; one or more second gains associated with the second FOV, a second duration to switch between using different codewords of the second codebook, or a second quantity of codewords included in the second codebook.

In some examples of the method, apparatuses, and non-transitory computer-readable medium described herein, the one or more first gains associated with the first FOV include a first average gain, a first five-percentile gain, or a combination thereof and the one or more second gains associated with the second FOV include a second average gain, a second five-percentile gain, or a combination thereof.

In some examples of the method, apparatuses, and non-transitory computer-readable medium described herein, the first FOV may be indicated as a first angular span including a first azimuth and a first elevation and the second FOV may be indicated as a second angular span including a second azimuth and a second elevation.

In some examples of the method, apparatuses, and non-transitory computer-readable medium described herein, the first duration to switch between using different codewords of the first codebook includes a maximum duration for the RIS to switch between using any two codewords of the first codebook and the second duration to switch between using different codewords of the second codebook includes a maximum duration for the RIS to switch between using any two codewords of the second codebook.

Some examples of the method, apparatuses, and non-transitory computer-readable medium described herein may further include operations, features, means, or instructions for transmitting, to the controller associated with the RIS based on the second set of parameters, a third indication of the second codebook and a subset of codewords of the second codebook and transmitting, using the RIS, a set of SSBs in accordance with the subset of codewords.

In some examples of the method, apparatuses, and non-transitory computer-readable medium described herein, the controller associated with the RIS may be included in a second network entity.

DETAILED DESCRIPTION

Figure 1:
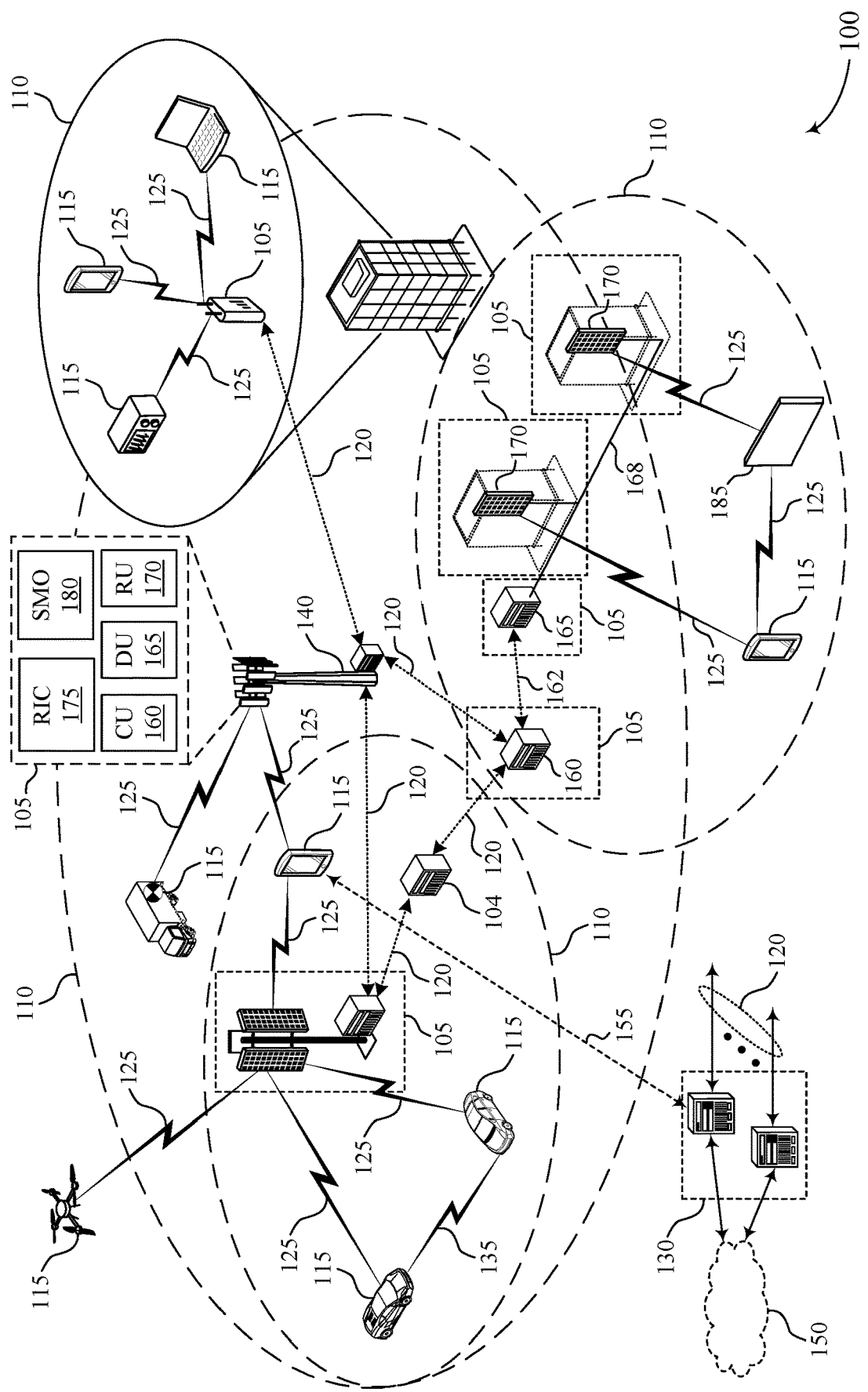
FIG. 1 shows an example of a wireless communications system that supports parameterized codebooks for reconfigurable intelligent surface (RIS)-assisted communications in accordance with one or more aspects of the present disclosure.

In some wireless communications systems, a network entity may support reconfigurable intelligent surface (RIS)-assisted communications. A RIS may be tuned to reflect or refract incoming signals at various angles, which may increase coverage and spectral efficiency, such as by enabling the network entity to support non-line of sight (LOS) communications (e.g., communicate around blockages). The network entity may select a codebook for communication using the RIS based on a location of a UE and characteristics of the RIS (e.g., location, field of view (FOV), reconfiguration latency, gain). Low level design factors of the RIS (e.g., fabrication details, component layout, software design) may affect the characteristics of the RIS. For example, each element of a set of elements of a RIS may have a power radiation pattern that impacts the ability of the RIS to reflect or refract an incoming signal at a given incident angle. An FOV obtained for the network entity by using the RIS may be directly impacted by the ability of the RIS to reflect or refract incoming signals. Additionally, or alternatively, a speed at which a RIS is able to switch between using different codewords of a codebook may depend on an architecture of the RIS (e.g., component layout, RIS control board implementation). However, the network entity may not have access to the low level design factors, nor can the RIS (e.g., a controller associated with the RIS) practically communicate the low level design factors to the network entity. Because the network entity may not have access to the low level design factors, the codebook selected by the network entity for communicating using the RIS may suffer from unknown or unexpected impacts to FOV, gain, and codeword switching latency that are based on the low level design factors of the RIS.

Various aspects generally relate to RIS-assisted communications, and more specifically, to utilizing parameterized codebooks for RIS-assisted communications. For example, a network entity may receive an indication of a one or more parameterized codebooks to be used for communication using a RIS to improve selection of codebooks for RIS-assisted communications without sharing low level RIS design factors. In a first example, an entity (e.g., an operations, administration, and maintenance (OAM) entity, the core network (NW), a RIS controller) may indicate a set of parameterized codebooks to the network entity, each associated with (e.g., indexed by) parameters. Each parameter may be associated with a codebook characteristic associated with using the corresponding codebook for RIS-assisted communications, such as cardinality (e.g., a quantity of codewords included in the codebook), FOV, gain associated with the FOV, and speed of codeword change (e.g., configuration switching latency, such as duration of switching between codewords of a codebook). The network entity may use the parameters to select a parameterized codebook that suits communication conditions at the network entity (e.g., traffic, channel conditions, latency constraints, gain constraints, target coverage area).

In a second example, the network entity may perform a handshake procedure with a RIS controller to receive one or more parameterized codebooks. For example, the network entity may provide communication parameters as inputs to the RIS controller, which may use the inputs to generate one or more codebooks attempting to satisfy the communication parameters. The RIS-controller may indicate the parameterized codebooks to the network entity, and the network entity may update its communication parameters and request the generation of new codebook(s) or indicate for the RIS controller to use the indicated parameterized codebook.

Particular aspects of the subject matter described in this disclosure can be implemented to realize one or more of the following potential advantages. For example, the techniques described herein may allow the network entity to know the FOV, gain, and codeword switching speed (e.g., configuration switching latency) associated with a given codebook and select codebooks accordingly, despite not knowing the low level RIS design factors. As such, the network entity may select codebooks to reliably satisfy communication conditions at the network entity. Additionally, coverage and communication reliability may be improved, for example, due to the network entity being able to accurately determine a FOV and gain associated with using a given codebook for RIS-assisted communications. Latency may also be reduced, for example, by enabling a network entity to select a codebook that satisfies configuration switching latency thresholds.

Aspects of the disclosure are initially described in the context of wireless communications systems. Aspects if the disclosure are also illustrated in the contexts of a RIS, a RIS controller, and process flows. Aspects of the disclosure are further illustrated by and described with reference to apparatus diagrams, system diagrams, and flowcharts that relate to parameterized codebooks for RIS-assisted communications.

FIG. 1 shows an example of a wireless communications system 100 that supports parameterized codebooks for RIS-assisted communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support parameterized codebooks for RIS-assisted communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may support RIS-assisted communications via a RIS 185. RIS-assisted communications may include communications between a transmitting entity and a receiving entity (e.g., the network entity 105 and the UE 115, or vice versa), where the transmitting entity transmits signals toward the RIS 185, and the RIS 185 reflects or refracts the signals toward the receiving device. In some cases, the RIS 185 may reflect or refract a signal anomalously (e.g., a reflection or refraction angle is not equal to the incident angle, a non-mirrored reflection or refraction) through the use of beamforming techniques, which the network entity 105 may configure by the use of a codeword in a codebook.

The network entity 105 may select a codebook for communication using the RIS 185 based on a location of the UE 115 and characteristics of the RIS 185 (e.g., location, field of view (FOV), reconfiguration latency). Low level design factors (e.g., fabrication details, component layout, software design) may affect the characteristics of the RIS 185. However, the network entity 105 may not have access to the low level design factors, nor can the RIS 185 (e.g., a controller associated with the RIS 185) practically communicate the low level design factors to the network entity 105. Thus, the codebook selected by the network entity for communicating using the RIS 185 may suffer from unknown or unexpected impacts to the FOV, a gain associated with the FOV, and codeword switching latency that are based on the low level design factors of the RIS 185.

In accordance with techniques described herein, the network entity 105 may indicate parameterized codebooks to improve selection of codebooks for RIS-assisted communications without receiving low level design factors of the RIS 185. Specifically, in a first example, an entity (e.g., an OAM entity (e.g., an entity responsible for processes and functions used in provisioning and managing the wireless communications system 100 or an element within the wireless communication system 100), the core network 130, a RIS controller) may indicate multiple parameterized codebooks to the network entity 105. The network entity 105 may use the parameters to select a parameterized codebook that suits communication conditions at the network entity 105 (e.g., traffic, channel conditions, latency constraints, gain constraints, target coverage area, etc.). As such, the network entity 105 may know the FOV, gain, and codeword switching speed associated with a given codebook and select codebooks accordingly, despite not knowing the low level design factors of the RIS 185.

In a second example, the network entity 105 may perform a handshake procedure with a RIS controller associated with the RIS 185 to receive one or more parameterized codebooks. For example, the network entity 105 may provide communication parameters as inputs to the RIS-controller, which may use the inputs to generate one or more codebooks attempting to satisfy the communication parameters. The RIS-controller may indicate the parameterized codebooks to the network entity 105, in response to which the network entity 105 may update its communication parameters and request the generation of new codebooks, or indicate the RIS controller to use the indicated parameterized codebook for communication using the RIS 185.

Figure 2A:
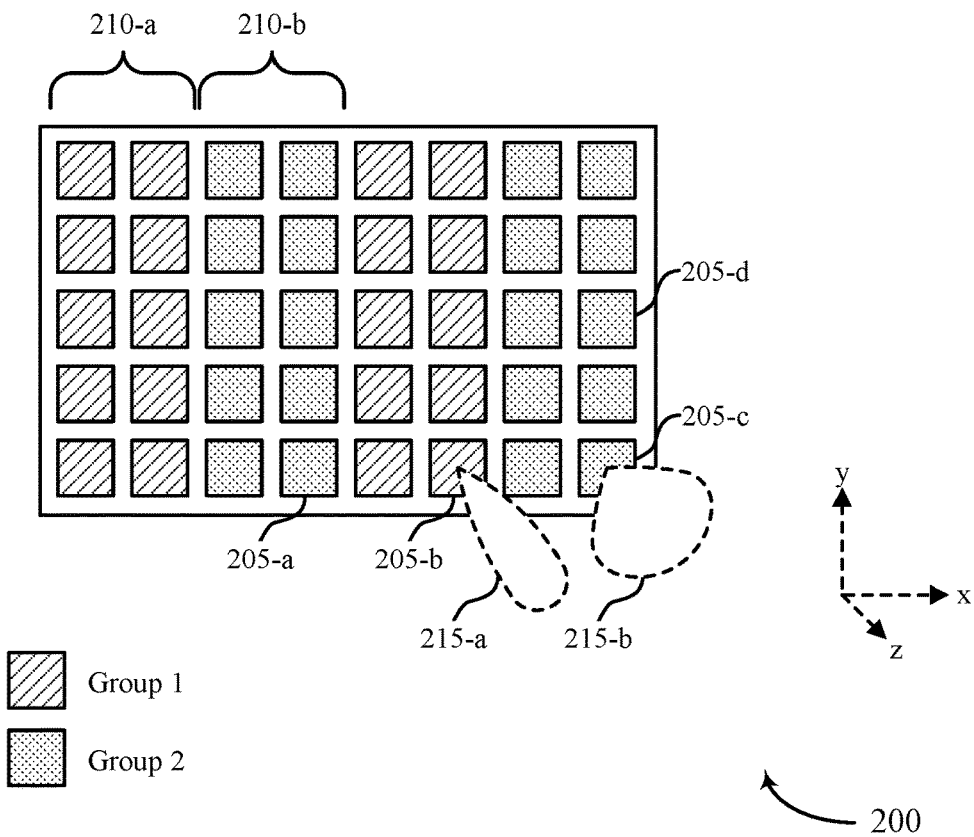
FIGS. 2A and 2B show examples of a RIS and a RIS control circuit, respectively, that support parameterized codebooks for RIS-assisted communications in accordance with one or more aspects of the present disclosure.
Figure 2B:
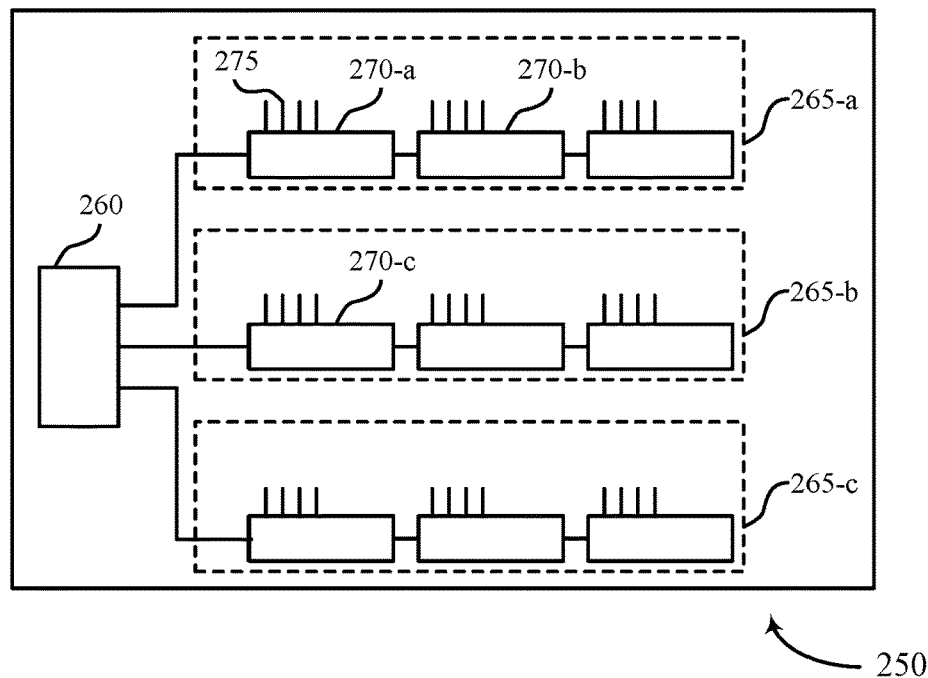

FIGS. 2A and 2B show examples of a RIS 200 and a RIS control circuit 250, respectively, that support parameterized codebooks for RIS-assisted communications in accordance with one or more aspects of the present disclosure. The RIS 200 and the RIS control circuit 250 may implement or be implemented by aspects of the wireless communications system 100. For example, the RIS 200 may be an example of the RIS 185 of FIG. 1. Additionally, the RIS 200 may be reconfigured, at least in part, using the RIS control circuit 250 in accordance with one or more codebooks indicated by a network entity 105.

A network entity 105 may use the RIS 200 to improve (e.g., boost) coverage, spectral efficiency, or both within a target area, while keeping a low energy and cost footprint. The RIS 200 may be reconfigurable, which may allow the network entity to realize multiple anomalous reflections or refractions off of or through the RIS 200. The anomalous reflections or refractions may improve (e.g., enhance) the end-to-end channel received (e.g., seen) by UEs 115 chosen by the network entity.

The RIS 200 may be reconfigurable due, at least in part, to a set of elements 205 (e.g., element 205-a, element 205-b, element 205-c, and element 205-d) that are part of the RIS 200 and that may be configured to reflect or refract incident signals while imparting a variable phase shift on the incident signal. The elements 205 may be organized (e.g., configured) into a quantity of element groups 210 (e.g., element group 210-a, and element group 210-b), for example, based on a phase shift imparted by the elements 205 of an element group 210. For example, elements 205 of a same element group 210 may be configured to impart a same phase shift on an incident signal, and the elements 205 may be reconfigured to be organized into different element groups 210, for example, based on a desired reflection or refraction angle of an incident signal. Each element 205 may be associated with a power radiation pattern 215 (e.g., power radiation pattern 215-a, and power radiation pattern 215-b).

A RIS controller may use the RIS control circuit 250 to reconfigure the elements 205 of the RIS 200. The RIS control circuit 250 may include a microcontroller 260 and a set of one or more serial banks 265 (e.g., serial bank 265-a, serial bank 265-b, and serial bank 265-c). Each serial bank may include a set of one or more shift registers 270 (e.g., shift register 270-a, shift register 270-b, and shift register 270-c) that are coupled together (e.g., wired together) serially. A shift register 270 may be electrically coupled with (e.g., connected to) a set of one or more components (e.g., pin diodes, varactors) via pins 275, where the components may be or be coupled with the elements 205. It is noted that example quantities of components are illustrated in FIGS. 2A and 2B and any quantity of elements 205, microcontrollers 260, serial banks 265, shift registers 270, and pins 275 may be included.

A power radiation pattern 215 may describe the strength (e.g., power) of a signal reflected in an arbitrary direction from an element 205. For example, the power radiation pattern 215-a associated with an element 205-b may indicate that the element 205-b may reflect or refract a signal with a relatively higher power at a relatively smaller angle (e.g., close to perpendicular with the face of the element 205-b) and with a relatively weaker power at a relatively larger angle (e.g., farther from perpendicular with the face of the element 205-b). In such an example, the power radiation pattern 215 may be termed a directive power radiation pattern, as the power radiation pattern 215 provides stronger reflected or refracted signals within a relatively small FOV. In contrast, the power radiation pattern 215-b associated an element 205-c may indicate that the element 205-c has a relatively wider FOV, but reflects or refracts signals with a weaker gain relative to an element 205 with a power radiation pattern 215-a. In such an example, the power radiation pattern 215-b is less directive than the power radiation pattern 215-a.

Various factors may determine the one or more power radiation patterns 215 associated with each of the elements 205. These factors may include a manufacturing process used to make the element 205, an incident angle of an incident signal to the element 205, and other factors. In some cases, the elements 205 of RIS 200 may be associated with a same power radiation pattern 215. In some other cases, various elements 205 may be associated with various power radiation patterns 215.

The power radiation patterns 215 of the elements 205 may impact the ability of the RIS 200 to reflect or refract an incident signal in a given (e.g., an anomalous) direction. For example, a majority of the elements 205 may be associated with the power radiation pattern 215-a, where the power radiation pattern 215-a may indicate that signals reflected or refracted at a large angle have a low power. In such an example, a network entity using the RIS 200 to communicate with one or more UEs 115 may experience low transmit power if the RIS 200 reflects or refracts a signal from the network entity 105 at a large reflection or refraction angle, because of the power radiation patterns 215 of the elements 205.

In some cases, a RIS 200 with elements 205 associated with more directive power radiation patterns 215 may experience a smaller FOV (e.g., angular span of coverage). However, a smaller FOV may be associated with a higher gain within the FOV. Alternatively, if the elements 205 in the RIS 200 are associated with less directive power radiation patterns 215, the RIS 200 may be associated with a larger FOV and a relatively lower gain within the FOV. In some cases, the use of a codebook with more codewords may mitigate the reduction in gain associated with a large FOV when compared to the use of a codebook with fewer codewords. For example, additional codewords may enable a network entity 105 to communicate with a UE 115 using a beam that is more closely directed to the direction of the UE 115, which may increase a gain of a signal communicated between the UE 115 and the network entity 105

In some cases, characteristics of the RIS 200 may impact a duration for the RIS 200 to switch between using different codewords of a codebook, which may be referred to as a configuration switching latency. In some cases, the configuration switching latency may be large (e.g., tens of microsecond), and may be a significant factor governing latency in RIS-assisted communications. In some cases, the configuration switching latency may depend on the layout of the RIS control circuit 250, a type of change between codewords (e.g., how many shift registers are updated to change respective outputs), and other factors.

For example, the elements 205 may be reconfigured using the shift registers 270. The shift registers 270 may electrically interface with a quantity of components (e.g., elements 205, components coupled with elements 205) to vary (e.g., shift) the phase imparted to a signal reflected or refracted via a corresponding element 205. The shift registers 270 may be controlled, in part, by a RIS controller using a codebook containing a quantity of codewords, where each codeword corresponds to a configuration of the RIS 200. For example, the microcontroller 260 may cause the shift registers 270 to adjust output signals (e.g., voltage, current, PWM) of the pins 275 to the components in accordance with a codeword of the codebook.

The RIS control circuit 250 may vary in layout. For example, the shift registers 270 may be organized in serial banks 265, and each serial bank 265 may be coupled to the microcontroller 260 in parallel (e.g., the microcontroller 260 may send respective signals to each serial bank 265 concurrently). The quantity of serial banks 265 and the quantity of shift registers 270 in each serial bank 265 may vary.

The layout of the RIS control circuit 250 may impact the configuration switching latency. For instance, the microcontroller 260 may be able to access each serial banks 265 simultaneously. However, the shift registers 270 within each serial bank 265 may be accessed over multiple clock cycles or periods, as they are coupled together serially. For example, the shift register 270-a and the shift register 270-b may be coupled serially in the serial bank 265-a. In such an example, the microcontroller may use multiple clock cycles to access (e.g., adjust output signaling of) shift register 270-b. The shift registers 270-a and 270-c may be coupled in parallel with the microcontroller 260, in serial bank 265-a and serial bank 265-b, respectively. As such, the microcontroller 260 may access the shift register 270-a and the shift register 270-c simultaneously. The duration of the microcontroller 260 accessing the shift registers 270 to adjust the outputs of the shift registers 270 from a first codeword to a second codeword may be the configuration switching latency.

Additionally, the style of the microcontroller 260 may impact the configuration switching latency. For instance, each serial bank 265 may be coupled with a respective pin on the microcontroller. In some cases, the total quantity of pins available on the microcontroller 260 may limit the quantity of serial banks 265 possible in the RIS control circuit 250. For example, if the microcontroller 260 has three total pins for controlling the shift registers 270, the RIS control circuit 250 may have three or less serial banks 265. Higher quantities of serial banks 265 with fewer quantities of shift registers 270 per bank may reduce configuration switching latency, for example, due to using fewer cycles to adjust the outputs of shift registers 270 at the end of a given serial bank 265.

In some cases, the element groups 210 may form reconfigurable patterns of the elements 205, where all elements 205 in each element group 210 may be configured (e.g., tuned to reflect or refract) similarly. The element groups 210 and the patterns formed of the elements 205 by the element groups 210 may be reconfigurable, such that the element groups 210 and the patterns may change dynamically. For example, the element groups 210 may be in the form of stripes across the RIS 200, such as the element group 210-a and the element group 210-b, or reconfigured in any other organization of the elements 205 into a pattern. In other words, although the form of the element groups 210 are shown as stripes vertically placed and evenly spaced throughout the RIS, it is acknowledged that the quantity and pattern of element groups 210 may be adjustable in a RIS 200. For example, some of the possible patterns of element groups 210 may include horizontal stripes, diagonal stripes, checkered squares, concentric squares, or any other pattern of any size, and the patterns formed by the element groups 210 may repeat or may not repeat.

Different patterns of the elements 205 may have different impacts on the RIS 200 performance. For example, if the element groups 210 form a pattern of stripes in the vertical (e.g., y) direction, the RIS 200 may produce anomalous reflections or refractions in a horizontal (e.g., x-z) plane. If the element groups 210 form a pattern of stripes in the horizontal (e.g., x) direction, the RIS 200 may produce anomalous reflections or refractions in a vertical (e.g., y-z) plane. Additionally, thinner element groups 210 (e.g., containing fewer columns or rows of elements 205) may increase the FOV (e.g., produce larger reflection or refraction angles) while increasing the configuration switching latency. Additionally, imposing constraints on possible patterns or structures of the elements 205 may limit the quantity and type of shift register adjustment and hence limit a quantity of used cycles or periods, thereby reducing configuration switching latency.

For example, the configuration switching latency may be impacted by the pattern of the element groups 210. For example, the elements 205 of RIS 200 may follow no pattern. In such an example, to configure the RIS 200 in accordance with a codeword of a codebook, each element 205 may be configured individually, adding to processing and implementation delays, which in turn may increase the configuration switching latency. In another example, the elements 205 of the RIS 200 may follow a vertical stripe pattern, such as illustrated by the element group 210-a and the element group 210-b. In such an example, to configure the RIS 200 for a codeword from a codebook, a RIS controller may make relatively fewer element configuration adjustments, decreasing the processing and implementation delays, which in turn may decrease the configuration switching latency. However, such pattern constraints may also impact the gain and FOV characteristics of the RIS 200, for example, by limiting the anomalous reflection or refraction angles supported by the RIS 200

The power radiation patterns 215 of each element 205, the layout of the RIS control circuit 250, and any patterns created by the element groups 210 may be examples of low level design factors. The low level design factors, as shown herein, may affect the use of the RIS 200, including the FOV, the gain, and the configuration switching latency. However, the low level design factors may not be known to a network entity 105 using the RIS 200, and may not be practically communicated between the RIS 200 (e.g., a RIS controller associated with the RIS 200) and the network entity 105.

Thus, in accordance with aspects described herein, a network entity 105 may utilize parameterized codebooks for RIS-assisted communications, where the parameterized codebooks may be indicative of the low level design factors and enable the network entity 105 to effectively determine codebooks to use for communicating with the RIS 200 without knowing the low level design factors of the RIS 200. For example, the codebooks may be parameterized by FOV, a gain associated with the FOV, a switching duration, a cardinality of the codebook, or a combination thereof. Thus, the parameters of a codebook affected by low level design factors may be indicated to the network entity 105 (e.g., such that knowledge of the low level design factors is unnecessary), which may enable the network entity 105 to more efficiently perform RIS-assisted communication, and a UE 115 being served via RIS-assisted communication may receive improved (e.g., more reliable) signaling.

Figure 3:
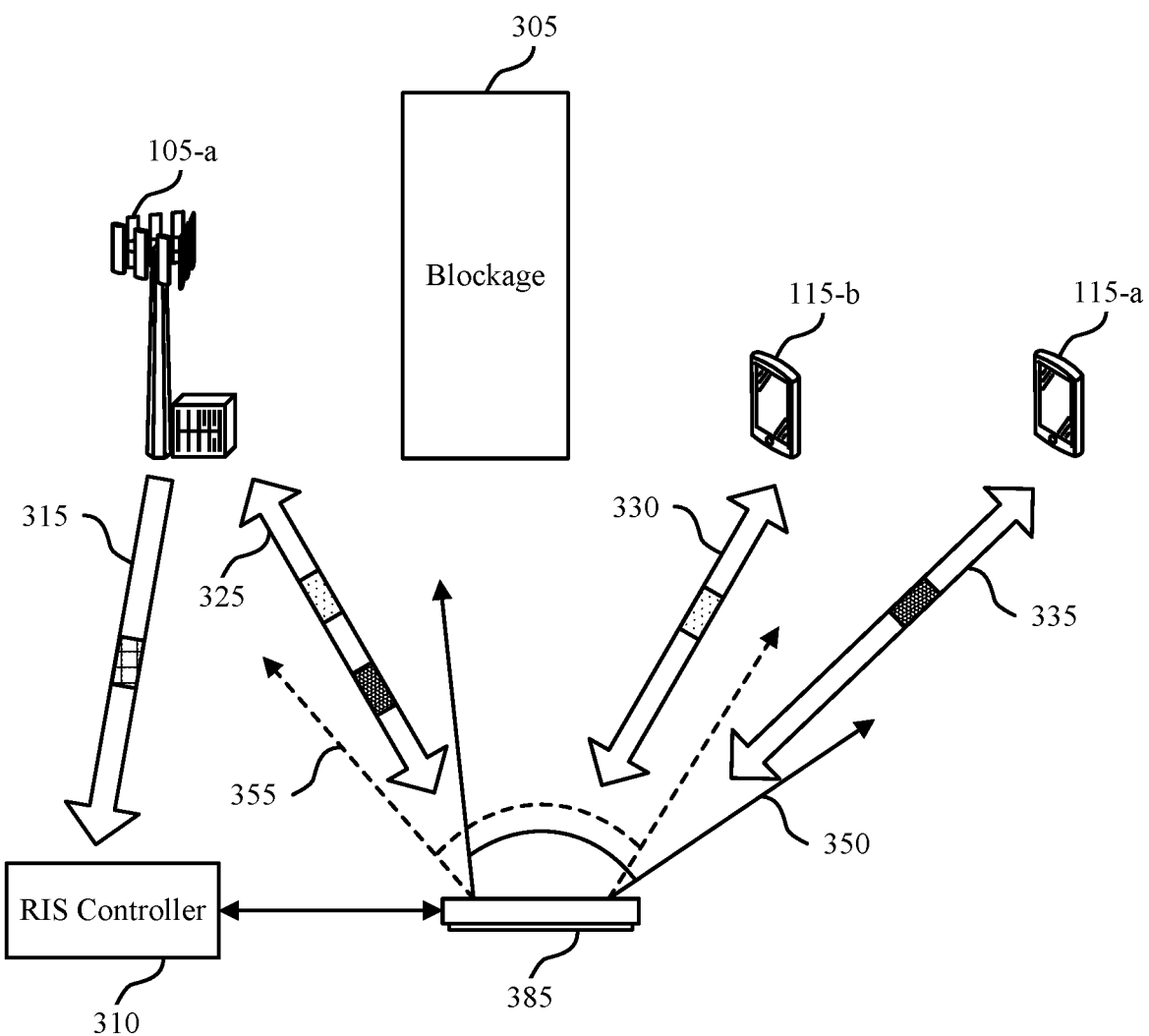
FIG. 3 shows an example of a wireless communications system that supports parameterized codebooks for RIS-assisted communications in accordance with one or more aspects of the present disclosure.

FIG. 3 shows an example of a wireless communications system 300 that supports parameterized codebooks for RIS-assisted communications in accordance with one or more aspects of the present disclosure. Some aspects of FIG. 3 may implement or be implemented by aspects of the wireless communications system 100, the RIS 200, and the RIS control circuit 250. For example, the wireless communications system 300 may contain a network entity 105-a and one or more UEs 115 (e.g., a UE 115-a and a UE 115-b). The network entity 105-a and the UEs 115 may be examples of a network entity 105 and a UE 115 described herein, including with reference to FIGS. 1 and 2, respectively. The communications between the network entity 105-a and the UEs 115 may be communications using a RIS 385, where the RIS 385 is at least in part controlled by a RIS controller 310. In some examples, the RIS 385 may be an example of a RIS 185 or a RIS 200 described with reference to FIGS. 1 and 2.

The network entity 105-a may communicate with the UE 115-a and 115-b using the RIS 385. For example, in the example of FIG. 3, the network entity 105-a may send transmissions (e.g., messages, indications) to (e.g., toward) the RIS 385 via a channel 325, and the RIS may reflect (e.g., anomalously) the transmissions to the UE 115-a and/or the UE 115-b via a channel 330 and a channel 335, respectively. In other examples, the RIS 385 may be operable to refract (e.g., anomalously) transmissions from the network entity 105-a to the UEs 115, and vice versa. In some examples, the channels 325, 330, and 335 may be examples of communication links 125 described with reference to FIG. 1. In some examples, a channel from the network entity 105-a to a UE 115 using the RIS 385 may be referred to as a cascaded channel. For example, the channel 325 and the channel 330 may together be a cascaded channel between the network entity 105-a and the UE 115-b. Similarly, the channel 325 and the channel 330 may together be a cascaded channel between the network entity 105-a and the UE 115-a.

In some cases, the network entity 105-a may utilize the RIS 385 based on a blockage 305 impeding transmission directly between the network entity 105-a and the UEs 115. For example, the blockage 305 may be an example of a building, a geological feature, or another object impeding direct transmission between the network entity 105-a and the UEs 115 (e.g., that prevents line-of-sight communications between the network entity 105-a and the UE 115).

The network entity 105-a may utilize codebooks to communicate using the RIS 385. A codebook may contain a set of codewords, where each codeword corresponds to (e.g., indicates) a configuration (e.g., tuning) of the RIS 385. A codebooks may be associated with a FOV, where the codewords included in the codebook correspond to configurations of the RIS 385 that in which an incident signal is reflected or refracted in a direction within the respective FOV. In some cases, a larger codebook may contain more codewords, and thus provide a finer granularity of directions to reflect or refract signals within an associated FOV. Transmitting and using a larger codebook may be associated with a higher signaling overhead relative to smaller codebooks.

In some examples, the UE 115-a and the UE 115-b may be located in different FOVs associated with different codebooks (e.g., a FOV 350 and a FOV 355, respectively). The FOV 350 may be associated with a first codebook, and the FOV 355 may be associated with a second codebook. In some cases, the UE 115-a and the UE 115-b may be located in different locations within a same FOV associated with a same codebook. For example, the UEs 115 may both be located within the FOV 350.

In accordance with techniques described herein, the network entity 105-a may utilize parameterized codebooks to improve communications using the RIS 385. A parameterized codebook may be parameterized (e.g., identified) by various parameters (e.g., identifiers), including cardinality (e.g., a quantity of codewords in a codebook), offered FOV (e.g., specified as an azimuth and elevation angular span), gain metrics associated with the FOV (e.g., average gain metric, five-percentile gain metric), a configuration switching latency (e.g., a maximum duration to switch between using different (any two) codewords in the codebook), or a combination thereof.

In some cases, the network entity 105-a may receive a set of parameterized codebooks from a second network entity 105. In some cases, the second network entity 105 may be an OAM entity, another network entity 105, the RIS controller 310, or a combination thereof. The indicated set of parameterized codebooks may be based on the receiving network entity 105 (e.g., network entity 105-a), communication conditions, or a combination thereof. For example, the set of parameterized codebooks may be based on the RIS(s) 385 available to the network entity 105-a. For instance, the parameterized codebooks may be specific to the RIS 385. Additionally, or alternatively, the set of parameterized codebooks may be based on an incident signal direction from the network entity 105-a to the RIS 385, a distance between the network entity 105-a and the RIS 385, channel conditions between the network entity 105-a and the RIS 385, capabilities of network entity 105-a and RIS 385, or a combination thereof, as well as other factors.

In some examples, the network entity 105-a may perform a handshake procedure with the RIS controller 310 to receive one or more parameterized codebooks. Additional details related to the handshake procedure are described with reference to FIG. 5 below.

The network entity 105-a may exchange signaling with the RIS controller 310 over a channel 315 to indicate (e.g., identify) a parameterized codebook and a codeword from the parameterized codebook. In some cases, the parameterized codebook may be from the set of parameterized codebooks. For example, the network entity 105-a may transmit, to the RIS controller 310, a codebook indication 320, indicating the parameterized codebook of the set of parameterized codebooks and one or more codewords of the parameterized codebook. In some cases, the RIS controller 310 may be collocated with the RIS 385 (e.g., included in the RIS 385), or located in a different location than the RIS 385 and coupled with the RIS 385.

The parameterized codebook (e.g., and the codeword) indicated by the network entity 105-a may be based on a set of parameters associated with the parameterized codebook. For instance, the network entity 105-a may select the parameterized codebook from the set of parameterized codebooks based on the set of parameters associated with the parameterized codebook satisfying one or more thresholds. For example, a FOV associated with the parameterized codebook may satisfy a threshold FOV, one or more gains (e.g., associated with the FOV) may satisfy one or more threshold gains, a configuration switching latency may satisfy a threshold duration, a cardinality associated with parameterized codebook may satisfy a cardinality threshold, or a combination thereof.

In some examples, the network entity 105-a may compare the set of parameters associated with the parameterized codebook with other sets of parameters associated with other parameterized codebooks of the set of parameterized codebooks, and may select the parameterized codebook based on the comparison. For example, the network entity 105-a may compare offered FOVs of respective codebooks together with respective gain metrics, cardinality, configuration switching latency, or a combination thereof, across multiple codebooks and may select a parameterized codebook based on the comparison and an intended service area to be covered via RIS assistance. In some examples, respective parameters associated with multiple parameterized codebooks may satisfy the one or more thresholds, and the network entity 105-a may select one of the multiple parameterized codebooks based on respective margins by which the thresholds are satisfied (e.g., select a parameterized codebook whose respective parameters satisfy the thresholds by relatively larger margins).

In some cases, the network entity 105-a may communicate one or more messages with the UEs 115 using the RIS 385 in accordance with a selected parameterized codebook. For example, the network entity 105-a may select a first parameterized codebook associated with the FOV 350 from the set of parameterized codebooks. The network entity may transmit the codebook indication 320 to the RIS controller 310 indicating the first parameterized codebook and a codeword from the first parameterized codebook, for example, that is associated with a beam directed to UE 115-a (e.g., nearest, most aligned) to the UE 115-a of the codewords of the first parameterized codebook). The network entity 105-a may transmit a message 340 to the RIS 385, and the RIS 385 may reflect the message 340 to the UE 115-a in accordance with the indicated codeword of the first parameterized codebook.

Additionally, or alternatively, the network entity 105-a may select a second parameterized codebook associated with the FOV 355 (e.g., or the FOV 350) from the set of parameterized codebooks. The network entity 105-a may transmit a codebook indication 320 to the RIS controller 310 indicating the second parameterized codebook and a codeword from the second parameterized codebook, for example, associated with a beam directed to the UE 115-b. The network entity 105-a may transmit a message 345 to the RIS 385, and the RIS 385 may reflect the message 345 to the UE 115-b in accordance with the indicated codeword of the second parameterized codebook.

In some examples, the network entity 105-a may use the indicated parameterized codebook to perform synchronization signal block (SSB) transmissions via the RIS 385. For example, the codebook indication 320 may indicate a subset of codewords of the parameterized codebook to the RIS controller 310 that may each be used for transmission of a respective SSB. For instance, the network entity 105-a may transmit, using the RIS 385, a set of SSBs to the UE 115-a, the UE 115-b, or both, in accordance with the subset of codewords. That is, each SSB may be reflected to the UE 115-a, the UE 115-b, or both, in accordance with a respective codeword of the subset of codewords. In some instances, the network entity 105-a may receive a respective report from the UE 115-a, the UE 115-b, or both, indicating a preferred SSB from the set of SSBs (e.g., which may indicate a preferred codeword of the parameterized codebook to use for communicating the respective UE 115). The network entity 105-a may communicate one or more messages with the UE 115-a, the UE 115-b, or both using the RIS 385 based on the report. For example, the network entity 105-a may communicate with a UE 115 using a codeword corresponding to the preferred SSB indicated by the report. In some cases, the network entity 105-a may classify, based on the report, the UE 115-a, the UE 115-b, or both, for coverage by the network entity 105-a using the RIS 385. For example, a UE 115 that reports a preferred SSB may be classified by the network entity 105-a as a UE 115 to be covered (e.g., served) via RIS assistance. In some examples, messages 340 and or messages 345 may be communicated with the UE 115-a, the UE 115-b, or both, using the RIS 385 based on the classifying.

Figure 4:
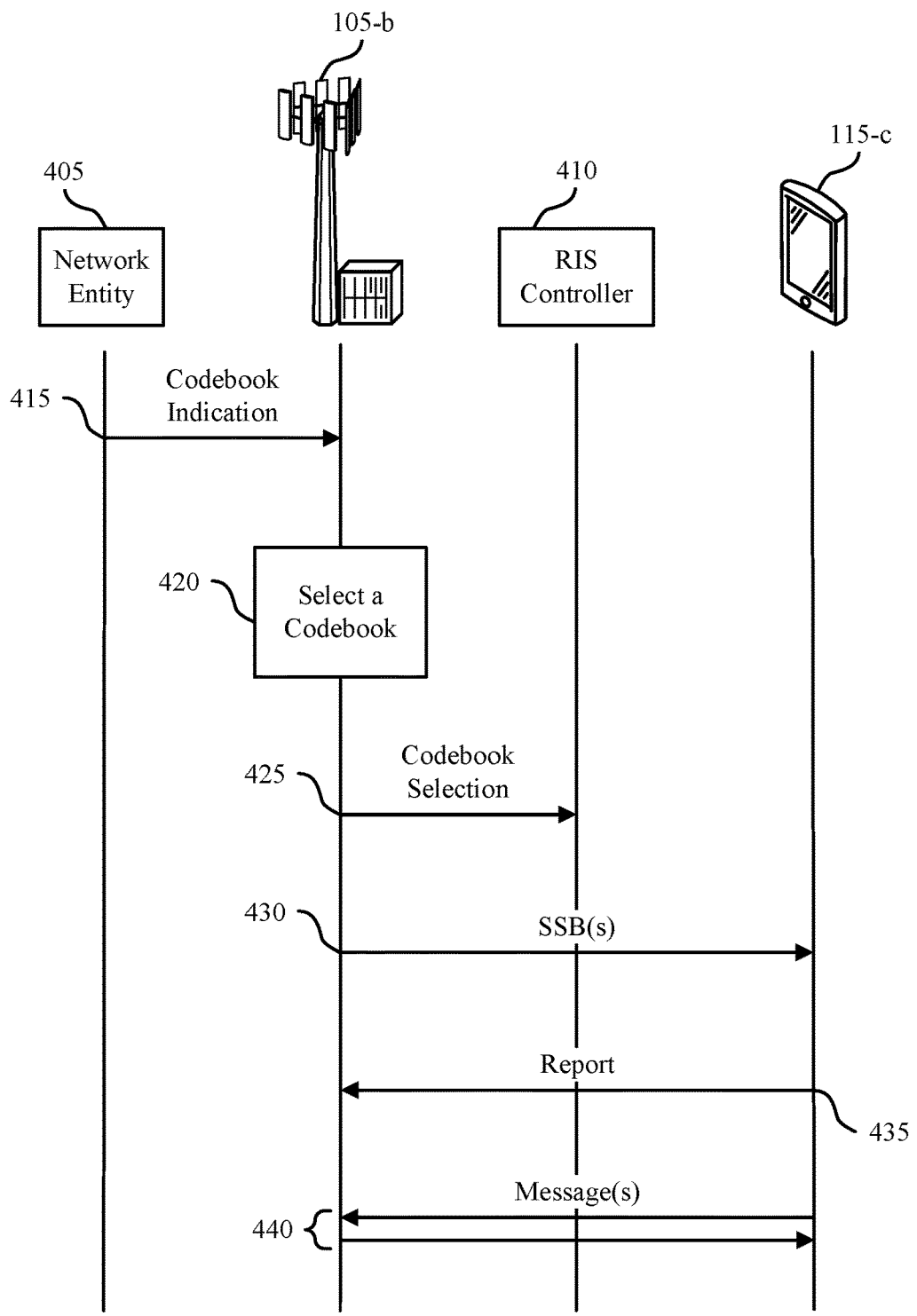
FIGS. 4 and 5 show examples of process flows that support parameterized codebooks for RIS-assisted communications in accordance with one or more aspects of the present disclosure.

FIG. 4 shows an example of a process flow 400 that supports parameterized codebooks for RIS-assisted communications in accordance with one or more aspects of the present disclosure. Aspects of the process flow 400 may implement or be implemented by aspects of wireless communications systems 100 and 300, as well as the RIS 200. For example, the process flow 400 may include a network entity 405, a network entity 105-b, a RIS controller 410, and a UE 115-c. The network entity 105-b and the UE 115-c may be examples of the corresponding devices described herein. Additionally, the RIS controller 410 may be an example of a RIS controller 310 described with reference to FIG. 3.

In the following description of the process flow 400, the operations between the network entity 105-b and the UE 115-c may be performed in a different order than the example order shown. Some operations may also be omitted from the process flow 400, and other operations may be added to the process flow 400. Further, although some operations or signaling may be shown to occur at different times for discussion purposes, these operations may actually occur at the same time.

At 415, the network entity 405 may transmit, and the network entity 105-b, may receive an indication of a set of parameterized codebooks. The set of parameterized codebooks may be associated with communication using a RIS, such as the RIS 185, the RIS 200, or the RIS 385, which may be coupled with (e.g., or include) the RIS controller 410. For example, the RIS controller 410 may control (e.g., configure) the RIS to support the network entity 105-b using the RIS for communicating with the UE 115-c. The indication may indicate a respective set of parameters associated with each respective parameterized codebook. In some cases, each parameterized codebook of the set of parameterized codebooks may be associated with (e.g., include) at least one of a respective FOV or a respective configuration switching latency associated with the parameterized codebook (e.g., a duration to switch between using different codewords of the parameterized codebook, such as a maximum duration to switch between using any two codewords of the parameterized codebook). In some examples, each parameterized codebook may be associated with a cardinality and one or more gain metrics associated with the respective FOV. For example, each parameterized codebook may be parameterized by a respective FOV, a respective configuration switching latency, a cardinality, one or more gain metrics associated with the respective FOV, or a combination thereof. In some examples, the indication of the set of parameterized codebooks may include respective sets of identifiers that each identify a parameter associated with a respective parameterized codebook.

At 420, the network entity 105-b may select a parameterized codebook from the set of parameterized codebooks to use for communicating using the RIS. In some cases, the network entity 105-b may select the parameterized codebook from the set of parameterized codebooks based on a set of parameters associated with the parameterized codebook satisfying one or more thresholds. For example, a FOV parameter associated with the parameterized codebook may satisfy a threshold FOV, one or more gain parameters (e.g., associated with the FOV) may satisfy one or more threshold gains, a configuration switching latency parameter may satisfy a threshold duration, a cardinality parameter may satisfy a cardinality threshold, or a combination thereof.

Satisfying a respective threshold may vary depending on the parameter. For example, a FOV parameter associated with a codebook may satisfy a FOV threshold if the FOV parameter indicates a FOV that is larger (e.g., wider, covering more area) than or larger than or equal to the FOV threshold. A configuration switching latency parameter may satisfy a threshold duration if the configuration switching latency parameter indicates a duration that is lower (e.g., a smaller duration of time) than or lower than or equal to the threshold duration. A cardinality parameter may satisfy a cardinality threshold if the cardinality parameter indicates a quantity of codewords that is greater than (e.g., or equal to) or lower than (e.g., or equal to) the cardinality threshold, for example, depending on the situation. A gain parameter may satisfy a threshold gain if the gain parameter is greater than (e.g., or equal to) the threshold gain.

At 425, the network entity 105-b may transmit, to the RIS controller 410, a codebook indication indicating the parameterized codebook selected from the set of parameterized codebooks and one or more codewords of the parameterized codebook.

At 430, the network entity 105-b may use the indicated parameterized codebook and codewords to perform SSB transmissions with the UE 115-c via the RIS associated with the RIS controller 410. For example, the codebook indication may indicate a subset of codewords from the selected parameterized codebook, and the RIS controller 410 may configure the RIS such that a set of SSBs transmitted by the network entity 105-b are reflected or refracted to the UE 115-c in accordance with the subset of codewords.

At 435, the network entity 105-b may receive a report from the UE 115-c. The report may indicate a preferred SSB from the set of SSBs. For example, the preferred SSB may correspond to an SSB received at the UE 115-c with a highest signal quality relative to the other SSBs of the set (e.g., a highest reference signal received power (RSRP), signal-to-noise ratio (SNR), signal-to-interference-plus-noise ratio (SINR), or a combination thereof, among other signal quality metrics). In some examples, in response to receiving the report, the network entity 105-b may classify the UE 115-c as a UE 115 to be covered via RIS assistance.

At 440, the network entity 105-b may communicate one or more messages with the UE 115-c using the RIS associated with the RIS controller 410. For example, the network entity 105-b may transmit one or more messages to the UE 115-c in accordance with one or more codewords indicated by the codebook indication. In some cases, the communication of the one or more messages may be based on the report received by the network entity 105-b (e.g., using a codeword corresponding to a preferred SSB indicated by the report).

Figure 5:
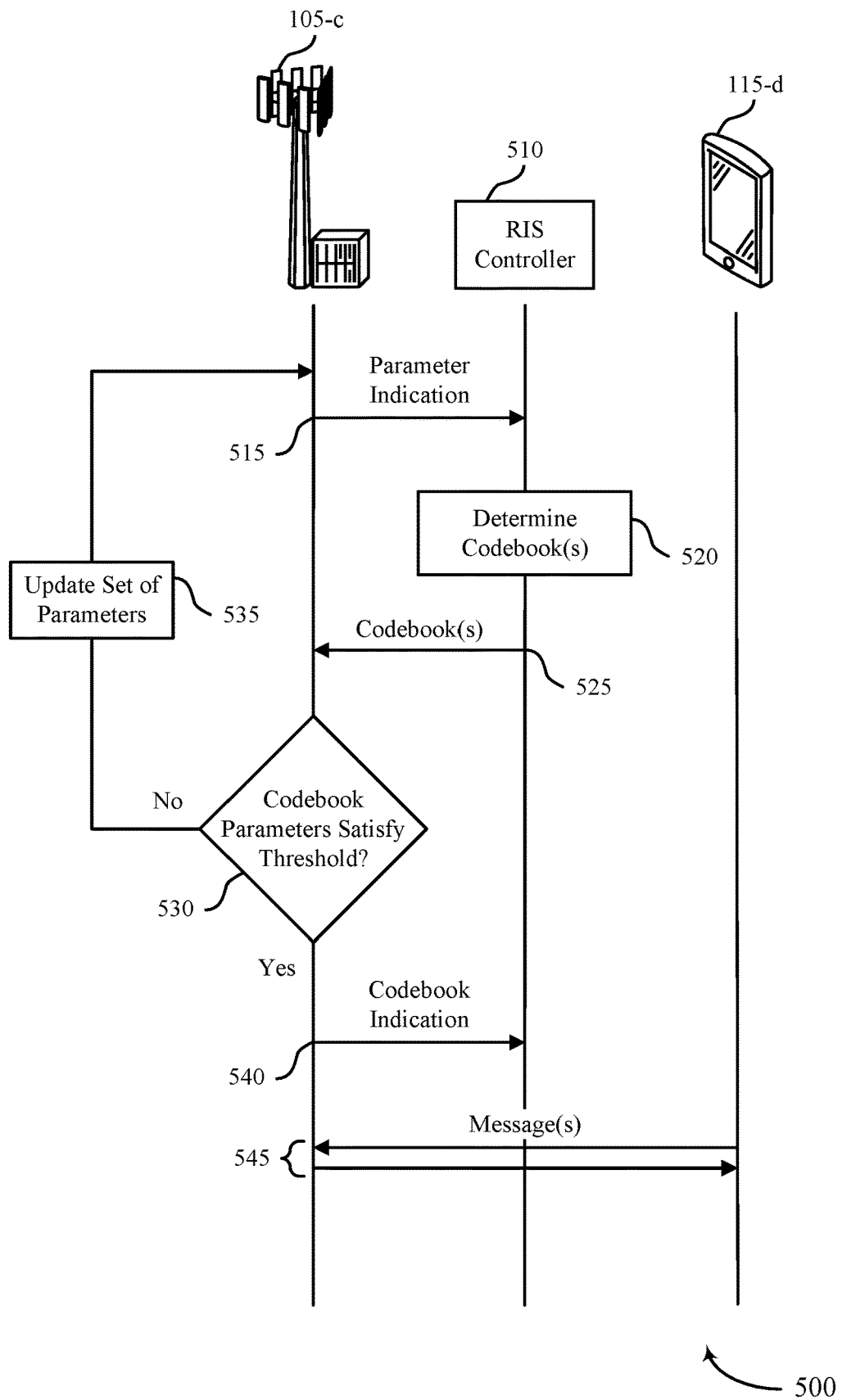

FIG. 5 shows an example of a process flow 500 that supports parameterized codebooks for RIS-assisted communications in accordance with one or more aspects of the present disclosure. Aspects of the process flow 500 may implement or be implemented by aspects of wireless communications systems 100 and 300, as well as the RIS 200. For example, the process flow 500 may include a network entity 105-c, a RIS controller 510, and a UE 115-d. The network entity 105-c and the UE 115-d may be examples of the corresponding devices described herein. Additionally, the RIS controller 410 may be an example of a RIS controller 310 or 410 described with reference to FIGS. 3 and 4.

In the following description of the process flow 400, the operations between the network entity 105-*c* and the UE 115-*d* may be performed in a different order than the example order shown. Some operations may also be omitted from the process flow 400, and other operations may be added to the process flow 400. Further, although some operations or signaling may be shown to occur at different times for discussion purposes, these operations may actually occur at the same time.

At 515, the network entity 105-*c* may transmit, to the RIS controller 510, an indication of a set of parameters associated with a desired codebook for communication using a RIS associated with the RIS controller 510. In some cases, the set of parameters may include a FOV (e.g., a range of reflected or refracted angles), one or more gains associated with the FOV, a configuration switching latency, an incident signal direction from the network entity 105-*c* to the RIS, a distance between the network entity 105-*c* and the RIS, a cardinality, a set of reflect or refract angles from the RIS to the UE 115-*d* and respective distance ranges associated with each angle of the set of angles (e.g., specific angles within a FOV and distance ranges associated with each specific angle), or a combination thereof. In some cases, each respective distance range may correspond to one or more expected distances from the RIS to the UE-115-*d* at each angle. In some cases, the indication may include a request for the RIS controller 510 to generate one or more codebooks based on the set of parameters.

At 520, the RIS controller 510 may determine one or more codebooks based on the set of parameters indicated by the network entity 105-*c*. For example, the RIS controller 510 may generate one or more codebooks that are realizable by the RIS (e.g., the RIS controller 510) while attempting to satisfy the set of parameters. For instance, the set of parameters may indicate respective thresholds that the RIS controller 510 is to attempt to satisfy in generating the one or more codebooks. As such, respective sets of parameters associated with the one or more codebooks generated by the RIS controller 510 may be based on the set of parameters indicated by the network entity 105-*c*.

At 525, the RIS controller 510 may transmit, and the network entity 105-*c* may receive, an indication of the one or more codebooks determined by the RIS controller.

At 530, the network entity 105-*c* may determine whether respective sets of parameters associated with the one or more codebooks satisfies one or more thresholds. For example, a FOV parameter associated with each of the one or more codebooks may satisfy a threshold FOV, one or more gain parameters (e.g., associated with the FOV) may satisfy one or more threshold gains, a configuration switching latency parameter may satisfy a threshold duration, a cardinality parameter may satisfy a threshold cardinality, or a combination thereof. In some examples, the one or more thresholds may correspond to one or more parameters of the set of parameters indicated by the network entity 105-*c*. In some examples, the one or more thresholds may be based on traffic associated with the network entity 105-*c*, user profiles (e.g., associated with one or more UEs 115 served by the network entity 105-*c*, such as using the RIS), channel conditions associated with the network entity 105-*c*, or a combination thereof.

At 535, the network entity 105-*c* may update the set of parameters. For example, if the one or more thresholds fail to be satisfied by the one or more codebooks, the network entity 105-*c*, the network entity 105-*c* may update one or more parameters of the set of parameters. The network entity 105-*c* may indicate the updated set of parameters to the RIS controller 510, which may determine (e.g., generate) one or more second codebooks based on the updated set of parameters and indicate the one or more codebooks to the network entity 105-*c*. In some cases, the network entity 105-*c* may adjust (e.g., alter) the set of UEs 115 to be served using RIS assisted communication via, for example, a hand-over of one or more UEs 115 to a different network entity 105. In some cases, the updating may be performed based on the adjusting of the set of UEs 115. For example, such adjusting may enable the network entity 105-*c* to ease constraints (e.g., thresholds) associated with codebooks generated by the RIS controller, such as by adjusting a FOV, one or more gain metrics, a cardinality, or a combination thereof, that is indicated to the RIS controller 510.

In some examples, the network entity 105-*c* may also update the set of parameters after determining that parameters associated with at least one of the one or more codebooks satisfies the one or more thresholds. For example, the network entity 105-*c* may update the set of parameters to preemptively request additional codebooks for other communication scenarios (e.g., generated based on other sets of parameters). In some cases, the network entity 105-*c* may store one or more of the codebooks indicated by the RIS controller 510, for example, for use in the other communication scenarios. For example, storing the codebooks may enable the network entity 105-*c* to select a codebook for communicating using the RIS without requesting the RIS controller 510 to generate additional codebooks, for example, to support various communication scenarios.

At 540, in the case that parameters associated with at least one of the one or more codebooks satisfy the one or more thresholds, the network entity 105-*c* may transmit, to the RIS controller 510, an indication of a codebook of the one or more codebooks. For example, the network entity 105-*c* may indicate the codebook based on a set of parameters associated with the one codebook satisfying the one or more thresholds. In some examples, the network entity 105-*c* may indicate a codeword of the indicated codebook. In some examples, if the RIS controller 510 indicates a single codebook in response to the indication of the set of parameters, the indication of the codebook may be a confirmation of the codebook.

At 545, the network entity 105-*c* may communicate one or more messages with the UE 115-*d* using the RIS associated with the RIS controller 510. The messages may be communicated in accordance with the indicated codebook indicated at 540. For example, the one or more messages may be communicated in accordance with one or more codewords of the indicated codebook (E.g., the indicated codeword). In some cases, the messages may include SSB transmissions.

Figure 6:
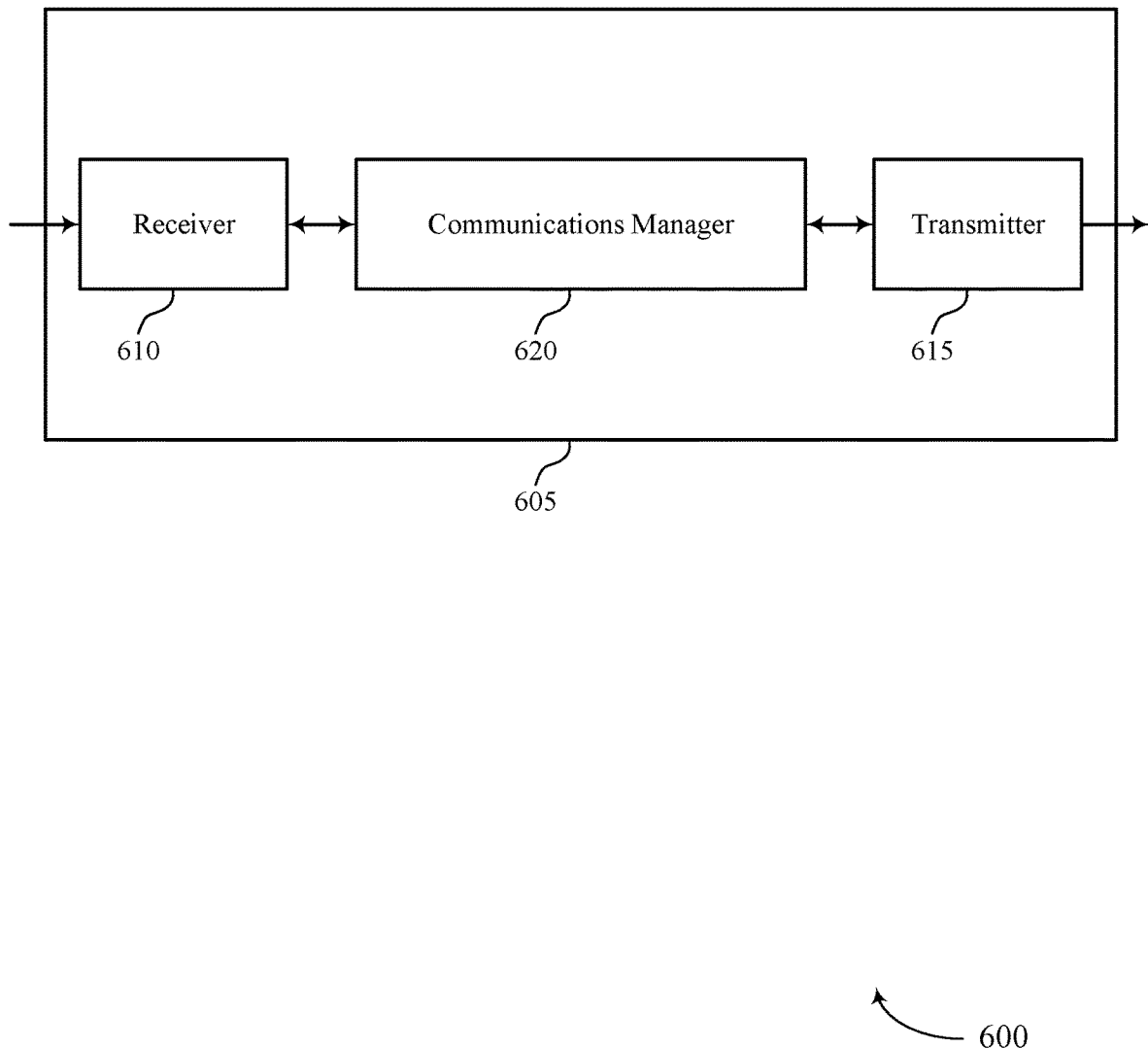
FIGS. 6 and 7 show block diagrams of devices that support parameterized codebooks for RIS-assisted communications in accordance with one or more aspects of the present disclosure.

FIG. 6 shows a block diagram 600 of a device 605 that supports parameterized codebooks for RIS-assisted communications in accordance with one or more aspects of the present disclosure. The device 605 may be an example of aspects of a network entity 105 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The communications manager 620, the receiver 610, the transmitter 615, or various combinations thereof or various components thereof may be examples of means for performing various aspects of parameterized codebooks for RIS-assisted communications as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a network entity in accordance with examples as disclosed herein. For example, the communications manager 620 is capable of, configured to, or operable to support a means for receiving a first indication of a set of codebooks associated with communication using a RIS, the first indication indicating a respective set of parameters associated with each codebook of the set of codebooks including at least one of a respective FOV associated with the codebook or a respective duration to switch between using different codewords of the codebook. The communications manager 620 is capable of, configured to, or operable to support a means for transmitting, to a controller associated with the RIS, a second indication of a first codebook of the set of codebooks and a codeword of the first codebook based on a set of parameters associated with the first codebook. The communications manager 620 is capable of, configured to, or operable to support a means for communicating one or more messages using the RIS in accordance with the codeword.

Additionally, or alternatively, the communications manager 620 may support wireless communications at a network entity in accordance with examples as disclosed herein. For example, the communications manager 620 is capable of, configured to, or operable to support a means for transmitting, to a controller associated with a RIS, a first indication of a first set of parameters associated with a first codebook for communication using the RIS. The communications manager 620 is capable of, configured to, or operable to support a means for receiving, from the controller based on transmitting the first indication, a second indication of a second codebook for the communication using the RIS, the second codebook associated with a second set of parameters that is based on the first set of parameters.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing and more efficient utilization of communication resources in association with communication using a RIS.

Figure 7:
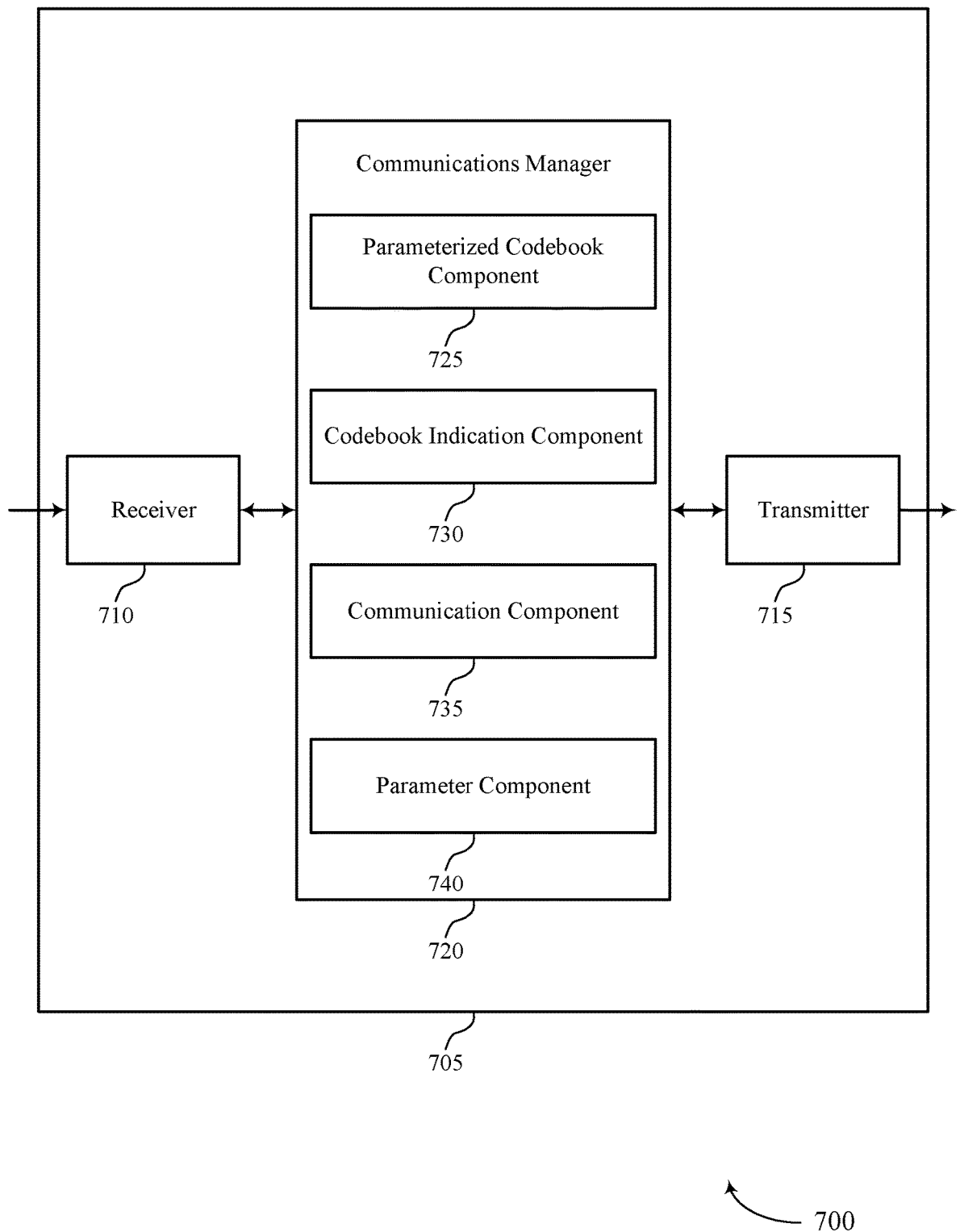

FIG. 7 shows a block diagram 700 of a device 705 that supports parameterized codebooks for RIS-assisted communications in accordance with one or more aspects of the present disclosure. The device 705 may be an example of aspects of a device 605 or a network entity 105 as described herein. The device 705 may include a receiver 710, a transmitter 715, and a communications manager 720. The device 705, or one of more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The device 705, or various components thereof, may be an example of means for performing various aspects of parameterized codebooks for RIS-assisted communications as described herein. For example, the communications manager 720 may include a parameterized codebook component 725, a codebook indication component 730, a communication component 735, a parameter component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a network entity in accordance with examples as disclosed herein. The parameterized codebook component 725 is capable of, configured to, or operable to support a means for receiving a first indication of a set of codebooks associated with communication using a RIS, the first indication indicating a respective set of parameters associated with each codebook of the set of codebooks including at least one of a respective FOV associated with the codebook or a respective duration to switch between using different codewords of the codebook. The codebook indication component 730 is capable of, configured to, or operable to support a means for transmitting, to a controller associated with the RIS, a second indication of a first codebook of the set of codebooks and a codeword of the first codebook based on a set of parameters associated with the first codebook. The communication component 735 is capable of, configured to, or operable to support a means for communicating one or more messages using the RIS in accordance with the codeword.

Additionally, or alternatively, the communications manager 720 may support wireless communications at a network entity in accordance with examples as disclosed herein. The parameter component 740 is capable of, configured to, or operable to support a means for transmitting, to a controller associated with a RIS, a first indication of a first set of parameters associated with a first codebook for communication using the RIS. The parameterized codebook component 725 is capable of, configured to, or operable to support a means for receiving, from the controller based on transmitting the first indication, a second indication of a second codebook for the communication using the RIS, the second codebook associated with a second set of parameters that is based on the first set of parameters.

Figure 8:
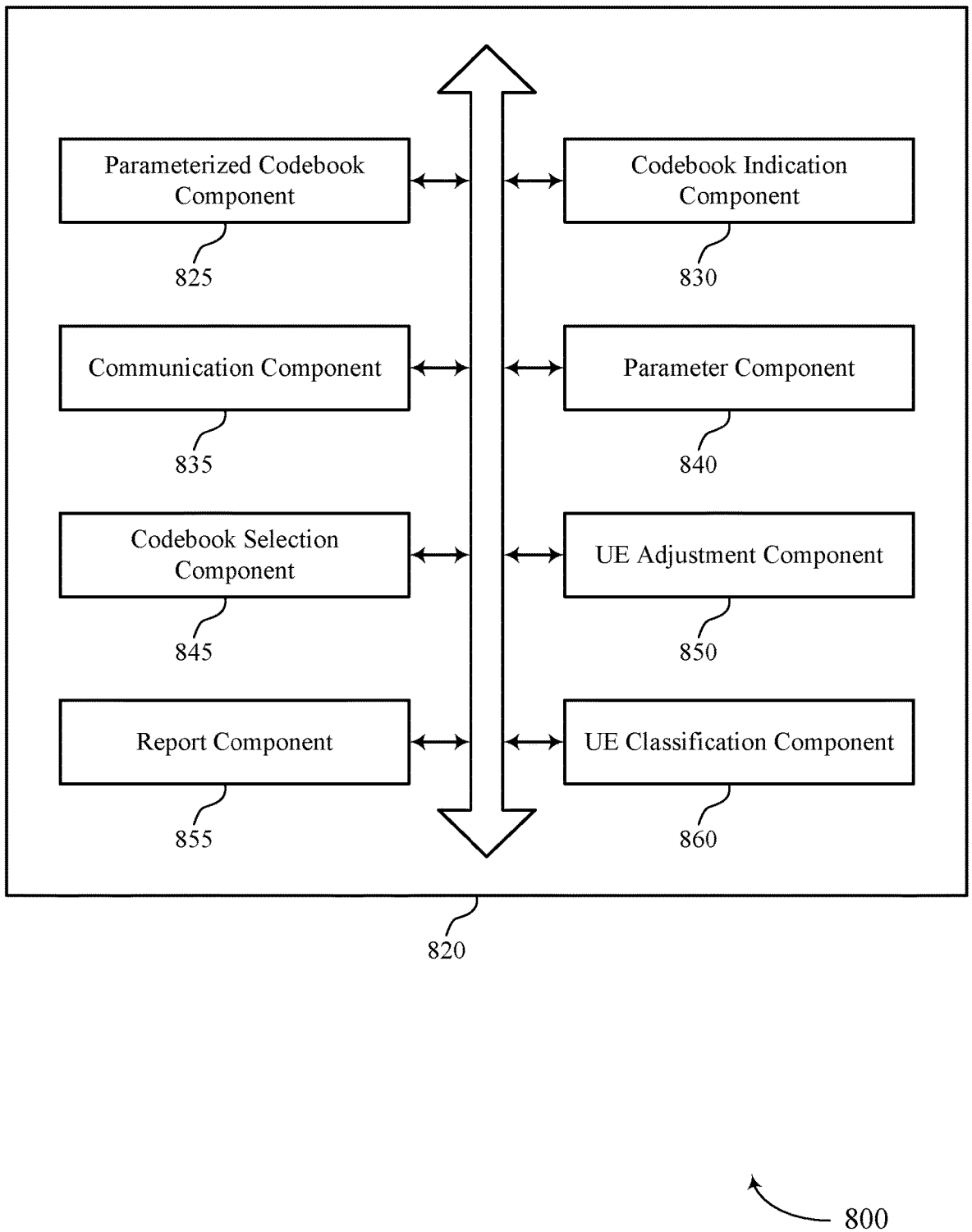
FIG. 8 shows a block diagram of a communications manager that supports parameterized codebooks for RIS-assisted communications in accordance with one or more aspects of the present disclosure.

FIG. 8 shows a block diagram 800 of a communications manager 820 that supports parameterized codebooks for RIS-assisted communications in accordance with one or more aspects of the present disclosure. The communications manager 820 may be an example of aspects of a communications manager 620, a communications manager 720, or both, as described herein. The communications manager 820, or various components thereof, may be an example of means for performing various aspects of parameterized codebooks for RIS-assisted communications as described herein. For example, the communications manager 820 may include a parameterized codebook component 825, a codebook indication component 830, a communication component 835, a parameter component 840, a codebook selection component 845, a UE adjustment component 850, a report component 855, a UE classification component 860, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 820 may support wireless communications at a network entity in accordance with examples as disclosed herein. The parameterized codebook component 825 is capable of, configured to, or operable to support a means for receiving a first indication of a set of codebooks associated with communication using a RIS, the first indication indicating a respective set of parameters associated with each codebook of the set of codebooks including at least one of a respective FOV associated with the codebook or a respective duration to switch between using different codewords of the codebook. The codebook indication component 830 is capable of, configured to, or operable to support a means for transmitting, to a controller associated with the RIS, a second indication of a first codebook of the set of codebooks and a codeword of the first codebook based on a set of parameters associated with the first codebook. The communication component 835 is capable of, configured to, or operable to support a means for communicating one or more messages using the RIS in accordance with the codeword.

In some examples, the codebook selection component 845 is capable of, configured to, or operable to support a means for selecting the first codebook from the set of codebooks based on the set of parameters satisfying one or more thresholds, where the set of parameters satisfying the one or more thresholds includes a FOV associated with the first codebook satisfying a threshold FOV, one or more gains associated with the FOV satisfying one or more threshold gains, a duration to switch between using different codewords of the first codebook satisfying a threshold duration, or a combination thereof, where the second indication is transmitted based on the selecting.

In some examples, the one or more gains associated with the FOV include an average gain, a five-percentile gain, or a combination thereof.

In some examples, to support receiving the first indication of the set of codebooks, the parameterized codebook component 825 is capable of, configured to, or operable to support a means for receiving the first indication of the set of codebooks from an OAM entity, a second network entity, or a controller associated with the RIS.

In some examples, the first indication of the set of codebooks includes a respective set of identifiers for each codebook of the set of codebooks, the respective set of identifiers including at least one of a first identifier indicating the respective FOV associated with the codebook, a second identifier indicating the respective duration to switch between using different codewords of the codebook, or a third identifier indicating a respective gain associated with the respective FOV.

In some examples, the set of codebooks corresponds to at least one of a first incident signal direction from the network entity to the RIS or a first distance between the network entity and the RIS. In some examples, the set of codebooks is different from a second set of codebooks that corresponds to at least one of a second incident signal direction from a second network entity to the RIS or a second distance between the second network entity and the RIS.

In some examples, the second indication indicates a subset of codewords of the first codebook that includes the codeword. In some examples, to support communicating the one or more messages using the RIS, the communication component 835 is capable of, configured to, or operable to support a means for transmitting, using the RIS, a set of SSBs in accordance with the subset of codewords.

In some examples, the report component 855 is capable of, configured to, or operable to support a means for receiving, from a UE, a report indicating a preferred SSB from the set of SSBs based on transmitting the set of SSBs. In some examples, the communication component 835 is capable of, configured to, or operable to support a means for communicating one or more second messages with the UE using the RIS based on the report.

In some examples, the UE classification component 860 is capable of, configured to, or operable to support a means for classifying, based on the report, the UE for coverage by the network entity using the RIS, where the one or more second messages are communicated with the UE based on the classifying.

In some examples, the first indication indicates the respective FOV associated with the codebook as an angular span including an azimuth and an elevation.

In some examples, the respective duration to switch between using different codewords of the codebook includes a maximum duration for the RIS to switch between using any two codewords of the codebook.

Additionally, or alternatively, the communications manager 820 may support wireless communications at a network entity in accordance with examples as disclosed herein. The parameter component 840 is capable of, configured to, or operable to support a means for transmitting, to a controller associated with a RIS, a first indication of a first set of parameters associated with a first codebook for communication using the RIS. In some examples, the parameterized codebook component 825 is capable of, configured to, or operable to support a means for receiving, from the controller based on transmitting the first indication, a second indication of a second codebook for the communication using the RIS, the second codebook associated with a second set of parameters that is based on the first set of parameters.

In some examples, the codebook indication component 830 is capable of, configured to, or operable to support a means for transmitting, to the controller associated with the RIS, a third indication of the second codebook based on the second set of parameters associated with the second codebook satisfying one or more thresholds. In some examples, the communication component 835 is capable of, configured to, or operable to support a means for communicating one or more messages using the RIS in accordance with the second codebook.

In some examples, the one or more thresholds are based on one or more channel conditions associated with the network entity, traffic associated with the network entity, one or more user profiles associated with the network entity, or a combination thereof.

In some examples, the parameter component 840 is capable of, configured to, or operable to support a means for transmitting, to the controller associated with the RIS, a third indication of a third set of parameters associated with a third codebook for the communication using the RIS based on the second set of parameters failing to satisfy one or more thresholds. In some examples, the parameterized codebook component 825 is capable of, configured to, or operable to support a means for receiving, from the controller based on transmitting the third indication, a fourth indication of a fourth codebook for the communication using the RIS, the fourth codebook associated with a fourth set of parameters that is based on the third set of parameters.

In some examples, the third set of parameters includes at least one of: a FOV associated with the third codebook; one or more gains associated with the FOV; a duration to switch between using different codewords of the third codebook; an incident signal direction from the network entity to the RIS; a distance between the network entity and the RIS; a quantity of codewords included in the third codebook; or a set of reflect or refract angles from the RIS to respective UEs and respective distance ranges associated with each angle of the set of angles, each respective distance range corresponding to one or more expected distances from the RIS to a UE at each angle.

In some examples, the parameter component 840 is capable of, configured to, or operable to support a means for updating the first set of parameters to the third set of parameters based on the second set of parameters failing to satisfy the one or more thresholds, where the third indication is transmitted based on the updating.

In some examples, the UE adjustment component 850 is capable of, configured to, or operable to support a means for adjusting a set of UEs associated with the communication using the RIS, where updating the first set of parameters to the third set of parameters is based on the adjusting.

In some examples, the one or more thresholds are based on one or more channel conditions associated with the network entity, traffic associated with the network entity, one or more user profiles associated with the network entity, or a combination thereof.

In some examples, the second indication indicates a set of codebooks for the communication using the RIS including the second codebook, each codebook of the set of codebooks associated with a respective set of parameters that is based on the first set of parameters.

In some examples, the codebook selection component 845 is capable of, configured to, or operable to support a means for selecting the second codebook based on the second set of parameters satisfying one or more thresholds, where the second set of parameters satisfying the one or more thresholds includes a FOV associated with the second codebook satisfying a threshold FOV, one or more gains associated with the FOV satisfying one or more threshold gains, a duration to switch between using different codewords of the second codebook satisfying a threshold duration, or a combination thereof. In some examples, the codebook indication component 830 is capable of, configured to, or operable to support a means for transmitting, to the controller associated with the RIS, a third indication of the second codebook and one or more codewords of the second codebook based on the selecting. In some examples, the communication component 835 is capable of, configured to, or operable to support a means for communicating one or more messages using the RIS in accordance with the one or more codewords.

In some examples, the first indication includes a request for the controller associated with the RIS to generate the second codebook based on the first set of parameters. In some examples, receiving the second indication of the second codebook is based on the request.

In some examples, the second indication of the second codebook includes a set of identifiers for the second codebook, the set of identifiers including at least one of a first identifier indicating a FOV associated with the second codebook, a second identifier indicating a duration to switch between using different codewords of the second codebook, or a third identifier indicating a gain associated with the FOV.

In some examples, the first set of parameters includes at least one of: a first FOV associated with the first codebook; one or more first gains associated with the first FOV; a first duration to switch between using different codewords of the first codebook; an incident signal direction from the network entity to the RIS; a distance between the network entity and the RIS; a first quantity of codewords included in the first codebook; or a set of reflect or refract angles from the RIS to respective UEs and respective distance ranges associated with each angle of the set of angles, each respective distance range corresponding to one or more expected distances from the RIS to a UE at each angle. In some examples, the second set of parameters includes at least one of a second FOV associated with the second codebook; one or more second gains associated with the second FOV, a second duration to switch between using different codewords of the second codebook, or a second quantity of codewords included in the second codebook.

In some examples, the one or more first gains associated with the first FOV include a first average gain, a first five-percentile gain, or a combination thereof. In some examples, the one or more second gains associated with the second FOV include a second average gain, a second five-percentile gain, or a combination thereof.

In some examples, the first FOV is indicated as a first angular span including a first azimuth and a first elevation. In some examples, the second FOV is indicated as a second angular span including a second azimuth and a second elevation.

In some examples, the first duration to switch between using different codewords of the first codebook includes a maximum duration for the RIS to switch between using any two codewords of the first codebook. In some examples, the second duration to switch between using different codewords of the second codebook includes a maximum duration for the RIS to switch between using any two codewords of the second codebook.

In some examples, the codebook indication component 830 is capable of, configured to, or operable to support a means for transmitting, to the controller associated with the RIS based on the second set of parameters, a third indication of the second codebook and a subset of codewords of the second codebook. In some examples, the communication component 835 is capable of, configured to, or operable to support a means for transmitting, using the RIS, a set of SSBs in accordance with the subset of codewords.

In some examples, the controller associated with the RIS is included in a second network entity.

Figure 9:
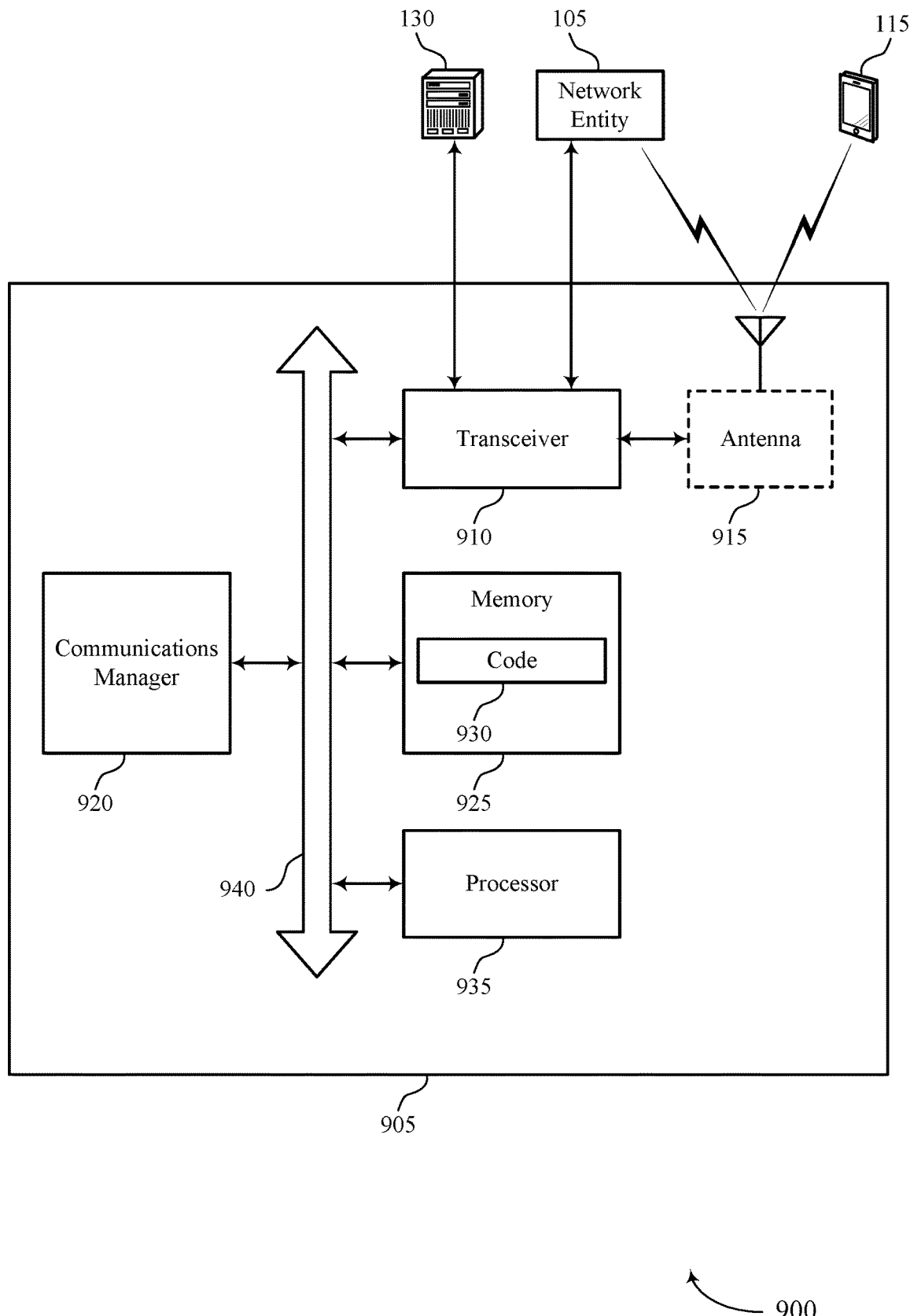
FIG. 9 shows a diagram of a system including a device that supports parameterized codebooks for RIS-assisted communications in accordance with one or more aspects of the present disclosure.

FIG. 9 shows a diagram of a system 900 including a device 905 that supports parameterized codebooks for RIS-assisted communications in accordance with one or more aspects of the present disclosure. The device 905 may be an example of or include the components of a device 605, a device 705, or a network entity 105 as described herein. The device 905 may communicate with one or more network entities 105, one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, an antenna 915, at least one memory 925, code 930, and at least one processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of transmitting or receiving wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. In some implementations, the transceiver 910 may include one or more interfaces, such as one or more interfaces coupled with the one or more antennas 915 that are configured to support various receiving or obtaining operations, or one or more interfaces coupled with the one or more antennas 915 that are configured to support various transmitting or outputting operations, or a combination thereof. In some implementations, the transceiver 910 may include or be configured for coupling with one or more processors or one or more memory components that are operable to perform or support operations based on received or obtained information or signals, or to generate information or other signals for transmission or other outputting, or any combination thereof. In some implementations, the transceiver 910, or the transceiver 910 and the one or more antennas 915, or the transceiver 910 and the one or more antennas 915 and one or more processors or one or more memory components (e.g., the at least one processor 935, the at least one memory 925, or both), may be included in a chip or chip assembly that is installed in the device 905. In some examples, the transceiver 910 may be operable to support communications via one or more communications links (e.g., a communication link 125, a backhaul communication link 120, a midhaul communication link 162, a fronthaul communication link 168).

The at least one memory 925 may include RAM, ROM, or any combination thereof. The at least one memory 925 may store computer-readable, computer-executable code 930 including instructions that, when executed by one or more of the at least one processor 935, cause the device 905 to perform various functions described herein. The code 930 may be stored in a non-transitory computer-readable medium such as system memory or another type of memory. In some cases, the code 930 may not be directly executable by a processor of the at least one processor 935 but may cause a computer (e.g., when compiled and executed) to perform functions described herein. In some cases, the at least one memory 925 may contain, among other things, a BIOS which may control basic hardware or software operation such as the interaction with peripheral components or devices. In some examples, the at least one processor 935 may include multiple processors and the at least one memory 925 may include multiple memories. One or more of the multiple processors may be coupled with one or more of the multiple memories which may, individually or collectively, be configured to perform various functions herein (for example, as part of a processing system).

The at least one processor 935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 935 may be configured to operate a memory array using a memory controller. In some other cases, a memory controller may be integrated into one or more of the at least one processor 935. The at least one processor 935 may be configured to execute computer-readable instructions stored in a memory (e.g., one or more of the at least one memory 925) to cause the device 905 to perform various functions (e.g., functions or tasks supporting parameterized codebooks for RIS-assisted communications). For example, the device 905 or a component of the device 905 may include at least one processor 935 and at least one memory 925 coupled with one or more of the at least one processor 935, the at least one processor 935 and the at least one memory 925 configured to perform various functions described herein. The at least one processor 935 may be an example of a cloud-computing platform (e.g., one or more physical nodes and supporting software such as operating systems, virtual machines, or container instances) that may host the functions (e.g., by executing code 930) to perform the functions of the device 905. The at least one processor 935 may be any one or more suitable processors capable of executing scripts or instructions of one or more software programs stored in the device 905 (such as within one or more of the at least one memory 925). In some implementations, the at least one processor 935 may be a component of a processing system. A processing system may generally refer to a system or series of machines or components that receives inputs and processes the inputs to produce a set of outputs (which may be passed to other systems or components of, for example, the device 905). For example, a processing system of the device 905 may refer to a system including the various other components or subcomponents of the device 905, such as the at least one processor 935, or the transceiver 910, or the communications manager 920, or other components or combinations of components of the device 905. The processing system of the device 905 may interface with other components of the device 905, and may process information received from other components (such as inputs or signals) or output information to other components. For example, a chip or modem of the device 905 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 905 may transmit information output from the chip or modem. Additionally, or alternatively, in some implementations, the one or more interfaces may refer to an interface between the processing system of the chip or modem and a receiver, such that the device 905 may obtain information or signal inputs, and the information may be passed to the processing system. A person having ordinary skill in the art will readily recognize that a first interface also may obtain information or signal inputs, and a second interface also may output information or signal outputs.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the at least one memory 925, the code 930, and the at least one processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with other network entities 105, and may include a controller or scheduler for controlling communications with UEs 115 in cooperation with other network entities 105. In some examples, the communications manager 920 may support an X2 interface within an LTE/LTE-A wireless communications network technology to provide communication between network entities 105.

The communications manager 920 may support wireless communications at a network entity in accordance with examples as disclosed herein. For example, the communications manager 920 is capable of, configured to, or operable to support a means for receiving a first indication of a set of codebooks associated with communication using a RIS, the first indication indicating a respective set of parameters associated with each codebook of the set of codebooks including at least one of a respective FOV associated with the codebook or a respective duration to switch between using different codewords of the codebook. The communications manager 920 is capable of, configured to, or operable to support a means for transmitting, to a controller associated with the RIS, a second indication of a first codebook of the set of codebooks and a codeword of the first codebook based on a set of parameters associated with the first codebook. The communications manager 920 is capable of, configured to, or operable to support a means for communicating one or more messages using the RIS in accordance with the codeword.

Additionally, or alternatively, the communications manager 920 may support wireless communications at a network entity in accordance with examples as disclosed herein. For example, the communications manager 920 is capable of, configured to, or operable to support a means for transmitting, to a controller associated with a RIS, a first indication of a first set of parameters associated with a first codebook for communication using the RIS. The communications manager 920 is capable of, configured to, or operable to support a means for receiving, from the controller based on transmitting the first indication, a second indication of a second codebook for the communication using the RIS, the second codebook associated with a second set of parameters that is based on the first set of parameters.

By including or configuring the communications manager 920 in accordance with examples as described herein, the device 905 may support techniques for improved communication reliability, improved coverage, reduced signaling overhead, improved codebook selection, and reduced latency in association with communication using a RIS.

In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the transceiver 910, one or more of the at least one processor 935, one or more of the at least one memory 925, the code 930, or any combination thereof (for example, by a processing system including at least a portion of the at least one processor 935, the at least one memory 925, the code 930, or any combination thereof). For example, the code 930 may include instructions executable by one or more of the at least one processor 935 to cause the device 905 to perform various aspects of parameterized codebooks for RIS-assisted communications as described herein, or the at least one processor 935 and the at least one memory 925 may be otherwise configured to, individually or collectively, perform or support such operations.

Figure 10:
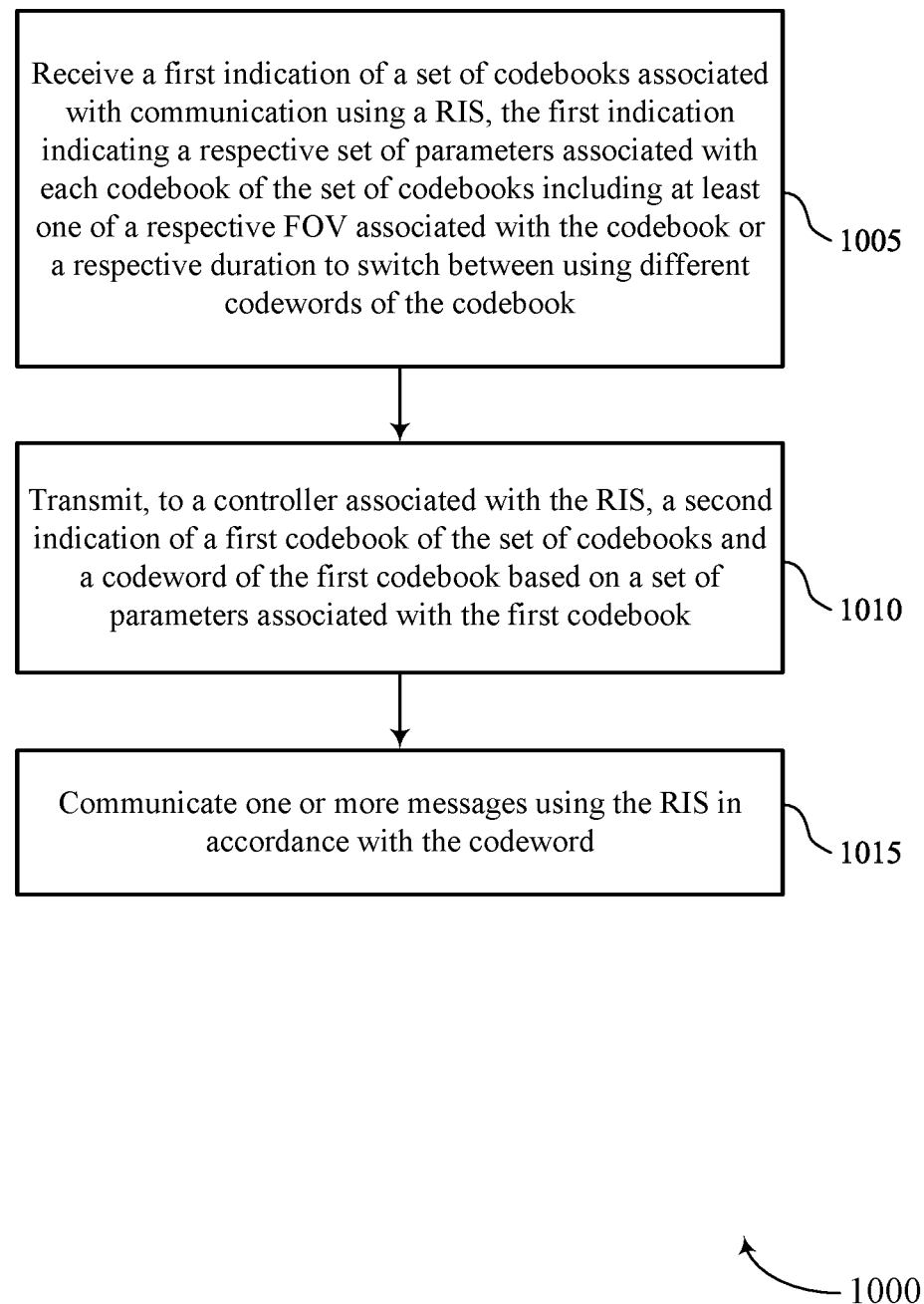
FIGS. 10 through 15 show flowcharts illustrating methods that support parameterized codebooks for RIS-assisted communications in accordance with one or more aspects of the present disclosure.

FIG. 10 shows a flowchart illustrating a method 1000 that supports parameterized codebooks for RIS-assisted communications in accordance with aspects of the present disclosure. The operations of the method 1000 may be implemented by a network entity or its components as described herein. For example, the operations of the method 1000 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1005, the method may include receiving a first indication of a set of codebooks associated with communication using a RIS, the first indication indicating a respective set of parameters associated with each codebook of the set of codebooks including at least one of a respective FOV associated with the codebook or a respective duration to switch between using different codewords of the codebook. The operations of block 1005 may be performed in accordance with examples as disclosed herein. In some examples, aspects of the operations of 1005 may be performed by a parameterized codebook component 825 as described with reference to FIG. 8.

At 1010, the method may include transmitting, to a controller associated with the RIS, a second indication of a first codebook of the set of codebooks and a codeword of the first codebook based on a set of parameters associated with the first codebook. The operations of block 1010 may be performed in accordance with examples as disclosed herein. In some examples, aspects of the operations of 1010 may be performed by a codebook indication component 830 as described with reference to FIG. 8.

At 1015, the method may include communicating one or more messages using the RIS in accordance with the codeword. The operations of block 1015 may be performed in accordance with examples as disclosed herein. In some examples, aspects of the operations of 1015 may be performed by a communication component 835 as described with reference to FIG. 8.

Figure 11:
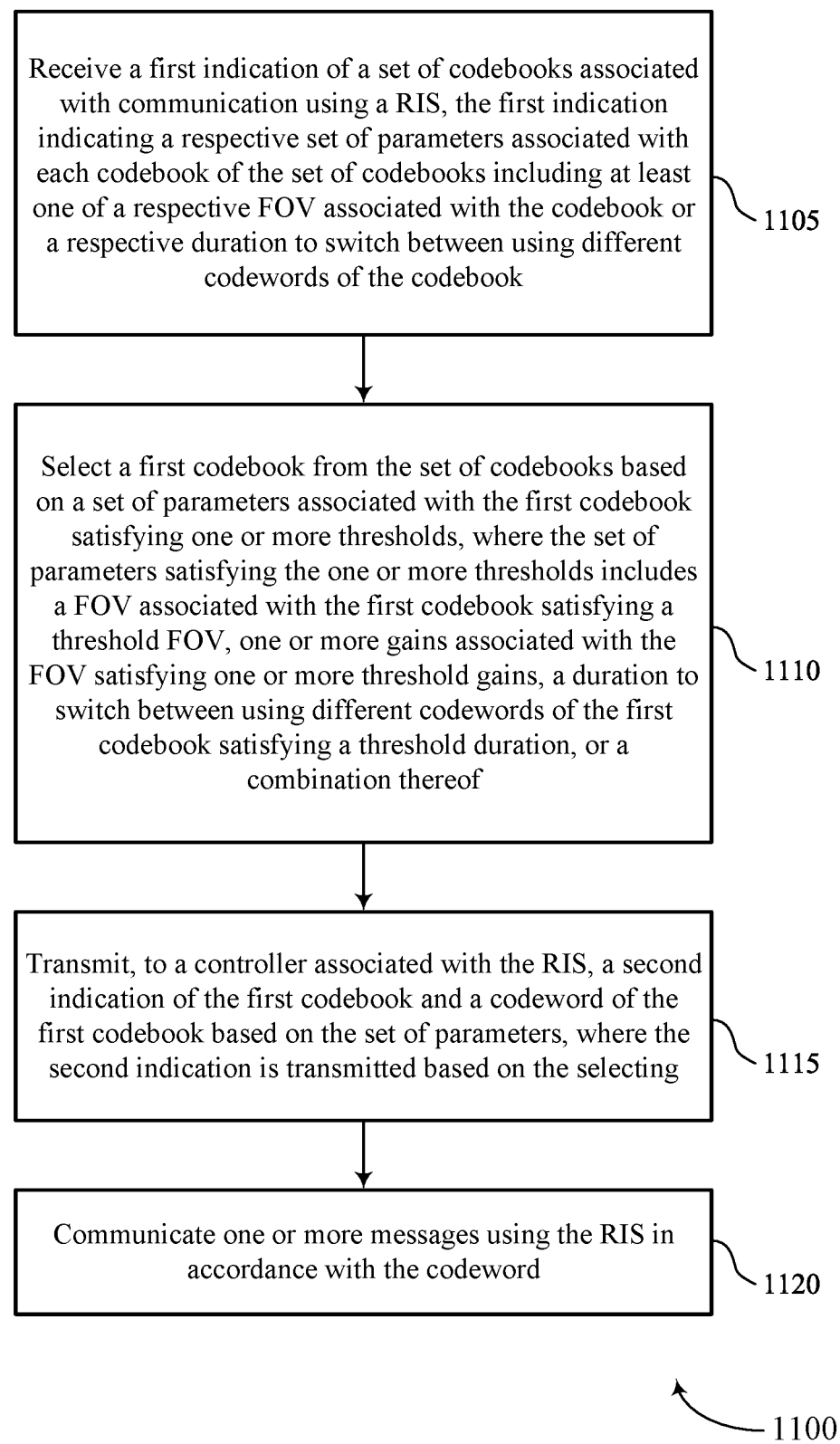

FIG. 11 shows a flowchart illustrating a method 1100 that supports parameterized codebooks for RIS-assisted communications in accordance with aspects of the present disclosure. The operations of the method 1100 may be implemented by a network entity or its components as described herein. For example, the operations of the method 1100 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1105, the method may include receiving a first indication of a set of codebooks associated with communication using a RIS, the first indication indicating a respective set of parameters associated with each codebook of the set of codebooks including at least one of a respective FOV associated with the codebook or a respective duration to switch between using different codewords of the codebook. The operations of block 1105 may be performed in accordance with examples as disclosed herein. In some examples, aspects of the operations of 1105 may be performed by a parameterized codebook component 825 as described with reference to FIG. 8.

At 1110, the method may include selecting a first codebook from the set of codebooks based on a set of parameters associated with the first codebook satisfying one or more thresholds, where the set of parameters satisfying the one or more thresholds includes a FOV associated with the first codebook satisfying a threshold FOV, one or more gains associated with the FOV satisfying one or more threshold gains, a duration to switch between using different codewords of the first codebook satisfying a threshold duration, or a combination thereof. The operations of block 1110 may be performed in accordance with examples as disclosed herein. In some examples, aspects of the operations of 1110 may be performed by a codebook selection component 845 as described with reference to FIG. 8.

At 1115, the method may include transmitting, to a controller associated with the RIS, a second indication of a first codebook of the set of codebooks and a codeword of the first codebook based on the set of parameters, where the second indication is transmitted based on the selecting. The operations of block 1115 may be performed in accordance with examples as disclosed herein. In some examples, aspects of the operations of 1115 may be performed by a codebook indication component 830 as described with reference to FIG. 8.

At 1120, the method may include communicating one or more messages using the RIS in accordance with the codeword. The operations of block 1120 may be performed in accordance with examples as disclosed herein. In some examples, aspects of the operations of 1120 may be performed by a communication component 835 as described with reference to FIG. 8.

Figure 12:
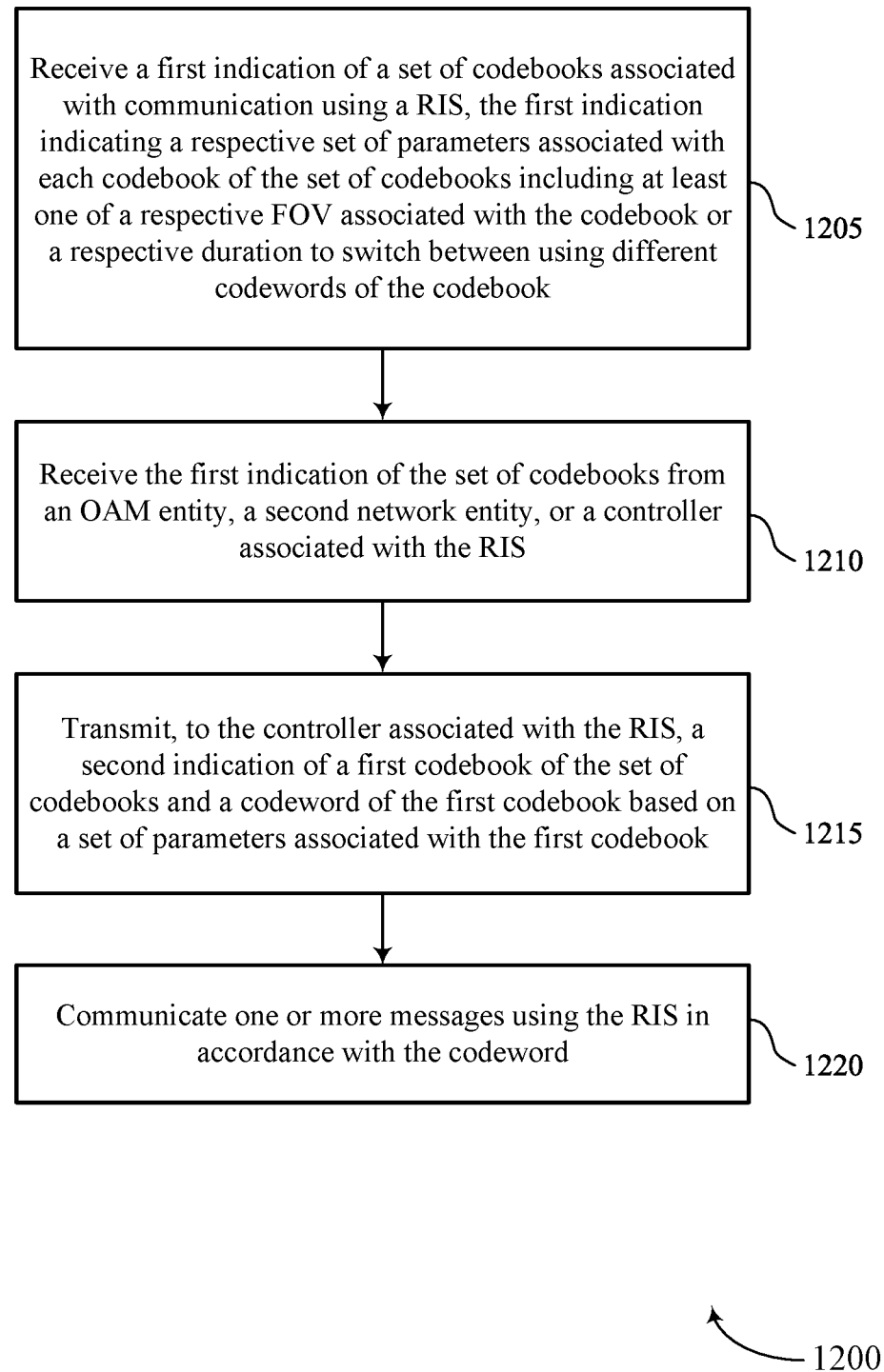

FIG. 12 shows a flowchart illustrating a method 1200 that supports parameterized codebooks for RIS-assisted communications in accordance with aspects of the present disclosure. The operations of the method 1200 may be implemented by a network entity or its components as described herein. For example, the operations of the method 1200 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1205, the method may include receiving a first indication of a set of codebooks associated with communication using a RIS, the first indication indicating a respective set of parameters associated with each codebook of the set of codebooks including at least one of a respective FOV associated with the codebook or a respective duration to switch between using different codewords of the codebook. The operations of block 1205 may be performed in accordance with examples as disclosed herein. In some examples, aspects of the operations of 1205 may be performed by a parameterized codebook component 825 as described with reference to FIG. 8.

At 1210, to support receiving the first indication, the method may include receiving the first indication of the set of codebooks from an OAM entity, a second network entity, or a controller associated with the RIS. The operations of block 1210 may be performed in accordance with examples as disclosed herein. In some examples, aspects of the operations of 1210 may be performed by a parameterized codebook component 825 as described with reference to FIG. 8.

At 1215, the method may include transmitting, to a controller associated with the RIS, a second indication of a first codebook of the set of codebooks and a codeword of the first codebook based on a set of parameters associated with the first codebook. The operations of block 1215 may be performed in accordance with examples as disclosed herein. In some examples, aspects of the operations of 1215 may be performed by a codebook indication component 830 as described with reference to FIG. 8.

At 1220, the method may include communicating one or more messages using the RIS in accordance with the codeword. The operations of block 1220 may be performed in accordance with examples as disclosed herein. In some examples, aspects of the operations of 1220 may be performed by a communication component 835 as described with reference to FIG. 8.

Figure 13:
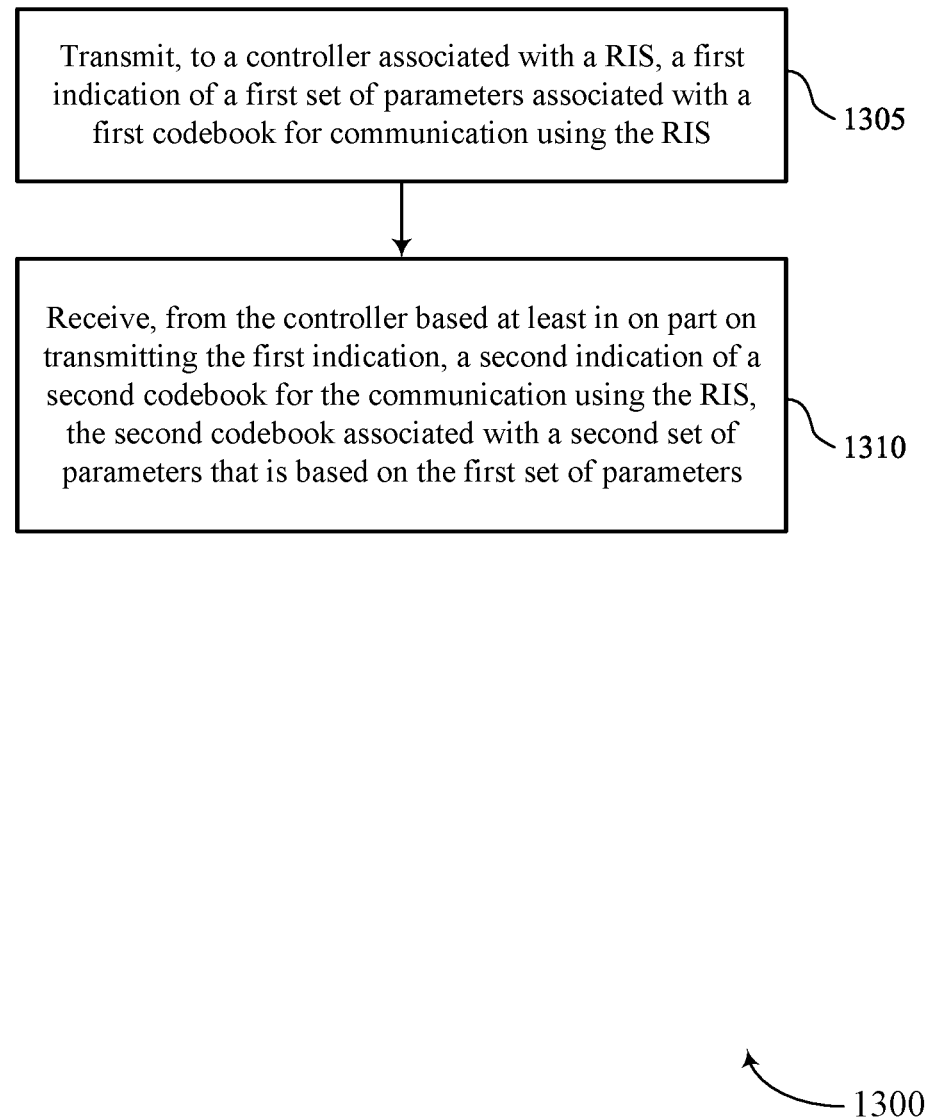

FIG. 13 shows a flowchart illustrating a method 1300 that supports parameterized codebooks for RIS-assisted communications in accordance with aspects of the present disclosure. The operations of the method 1300 may be implemented by a network entity or its components as described herein. For example, the operations of the method 1300 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1305, the method may include transmitting, to a controller associated with a RIS, a first indication of a first set of parameters associated with a first codebook for communication using the RIS. The operations of block 1305 may be performed in accordance with examples as disclosed herein. In some examples, aspects of the operations of 1305 may be performed by a parameter component 840 as described with reference to FIG. 8.

At 1310, the method may include receiving, from the controller based on transmitting the first indication, a second indication of a second codebook for the communication using the RIS, the second codebook associated with a second set of parameters that is based on the first set of parameters. The operations of block 1310 may be performed in accordance with examples as disclosed herein. In some examples, aspects of the operations of 1310 may be performed by a parameterized codebook component 825 as described with reference to FIG. 8.

Figure 14:
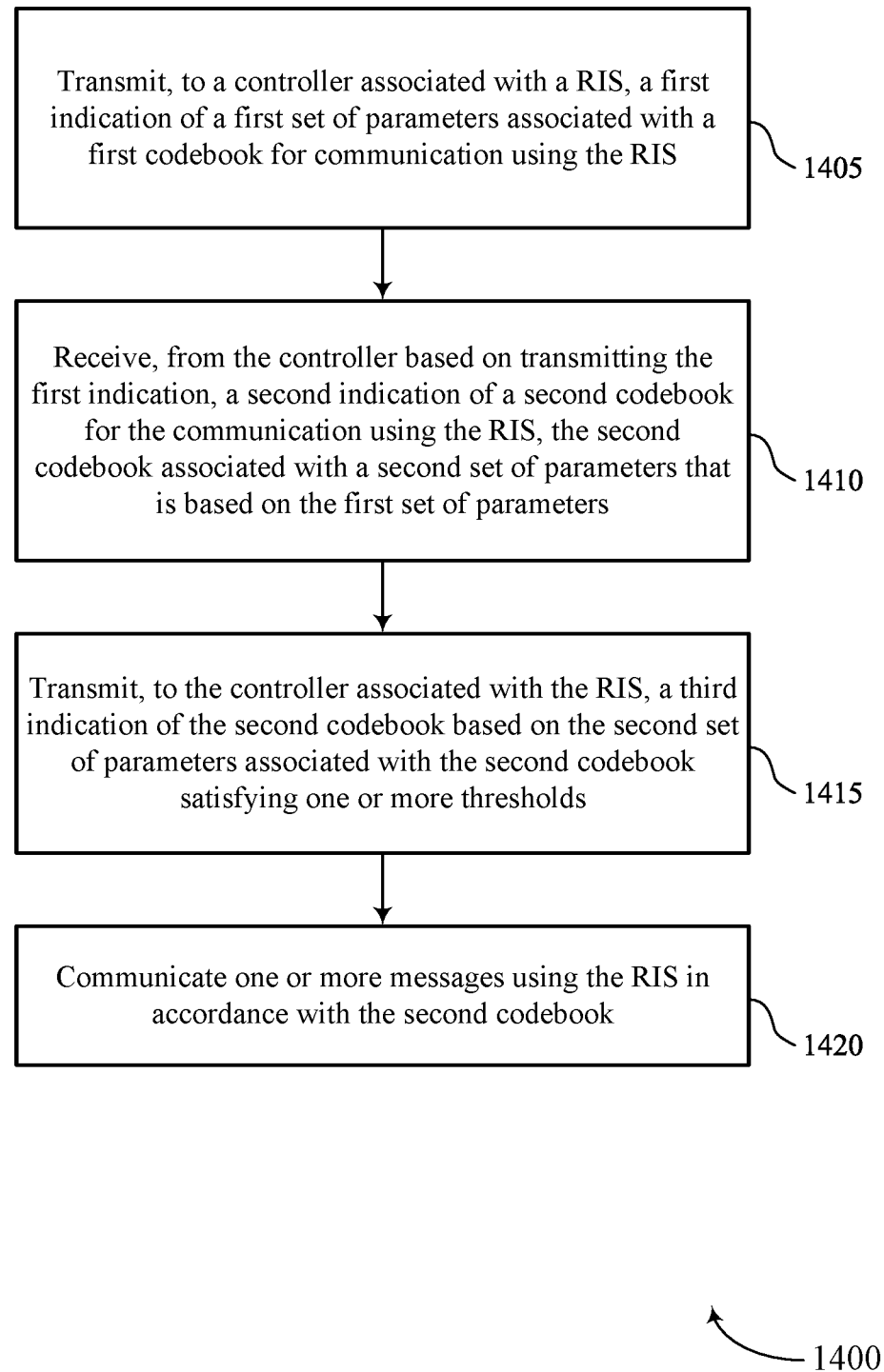

FIG. 14 shows a flowchart illustrating a method 1400 that supports parameterized codebooks for RIS-assisted communications in accordance with aspects of the present disclosure. The operations of the method 1400 may be implemented by a network entity or its components as described herein. For example, the operations of the method 1400 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1405, the method may include transmitting, to a controller associated with a RIS, a first indication of a first set of parameters associated with a first codebook for communication using the RIS. The operations of block 1405 may be performed in accordance with examples as disclosed herein. In some examples, aspects of the operations of 1405 may be performed by a parameter component 840 as described with reference to FIG. 8.

At 1410, the method may include receiving, from the controller based on transmitting the first indication, a second indication of a second codebook for the communication using the RIS, the second codebook associated with a second set of parameters that is based on the first set of parameters. The operations of block 1410 may be performed in accordance with examples as disclosed herein. In some examples, aspects of the operations of 1410 may be performed by a parameterized codebook component 825 as described with reference to FIG. 8.

At 1415, the method may include transmitting, to the controller associated with the RIS, a third indication of the second codebook based on the second set of parameters associated with the second codebook satisfying one or more thresholds. The operations of block 1415 may be performed in accordance with examples as disclosed herein. In some examples, aspects of the operations of 1415 may be performed by a codebook indication component 830 as described with reference to FIG. 8.

At 1420, the method may include communicating one or more messages using the RIS in accordance with the second codebook. The operations of block 1420 may be performed in accordance with examples as disclosed herein. In some examples, aspects of the operations of 1420 may be performed by a communication component 835 as described with reference to FIG. 8.

Figure 15:
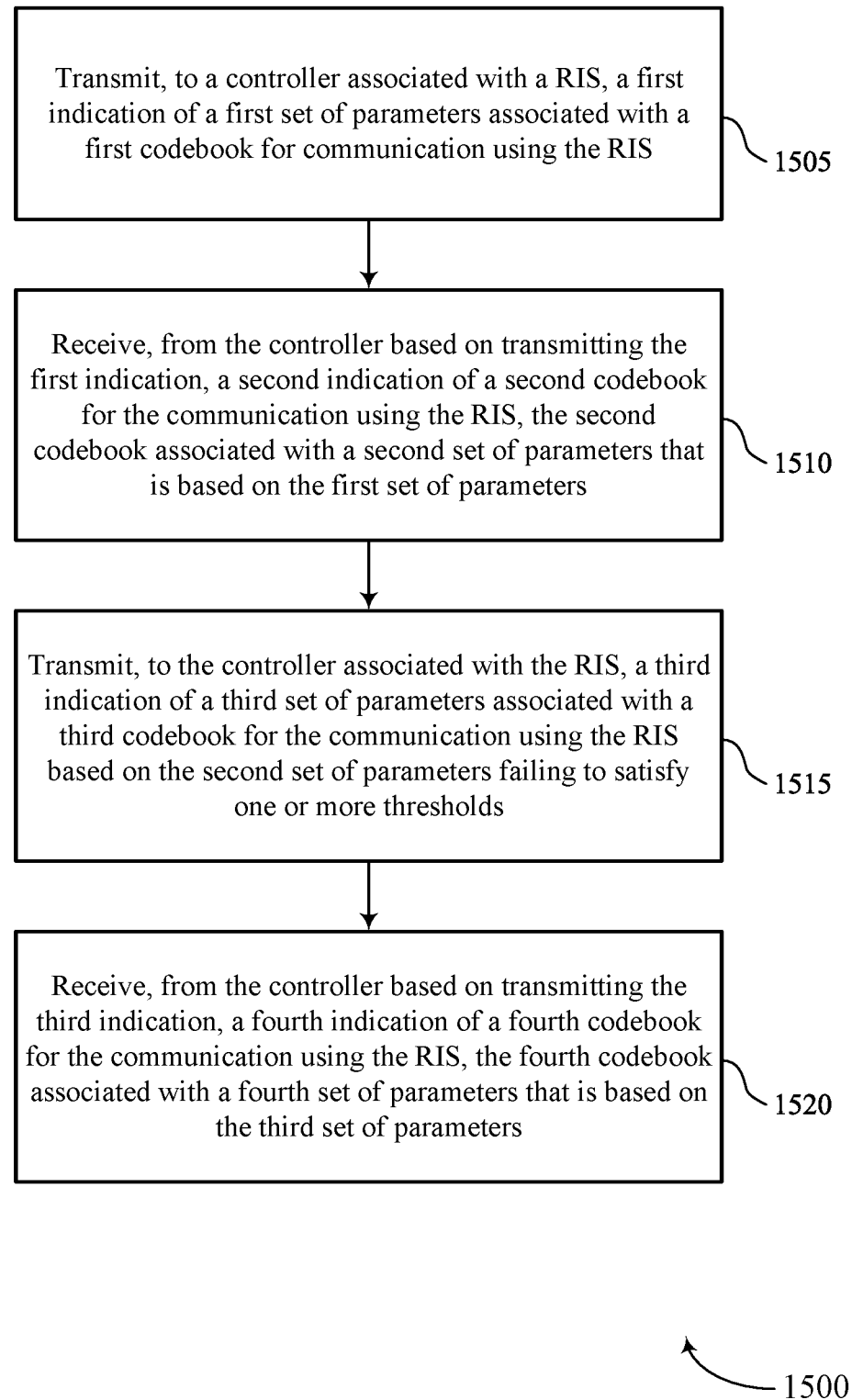

FIG. 15 shows a flowchart illustrating a method 1500 that supports parameterized codebooks for RIS-assisted communications in accordance with aspects of the present disclosure. The operations of the method 1500 may be implemented by a network entity or its components as described herein. For example, the operations of the method 1500 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, to a controller associated with a RIS, a first indication of a first set of parameters associated with a first codebook for communication using the RIS. The operations of block 1505 may be performed in accordance with examples as disclosed herein. In some examples, aspects of the operations of 1505 may be performed by a parameter component 840 as described with reference to FIG. 8.

At 1510, the method may include receiving, from the controller based on transmitting the first indication, a second indication of a second codebook for the communication using the RIS, the second codebook associated with a second set of parameters that is based on the first set of parameters. The operations of block 1510 may be performed in accordance with examples as disclosed herein. In some examples, aspects of the operations of 1510 may be performed by a parameterized codebook component 825 as described with reference to FIG. 8.

At 1515, the method may include transmitting, to the controller associated with the RIS, a third indication of a third set of parameters associated with a third codebook for the communication using the RIS based on the second set of parameters failing to satisfy one or more thresholds. The operations of block 1515 may be performed in accordance with examples as disclosed herein. In some examples, aspects of the operations of 1515 may be performed by a parameter component 840 as described with reference to FIG. 8.

At 1520, the method may include receiving, from the controller based part on transmitting the third indication, a fourth indication of a fourth codebook for the communication using the RIS, the fourth codebook associated with a fourth set of parameters that is based on the third set of parameters. The operations of block 1520 may be performed in accordance with examples as disclosed herein. In some examples, aspects of the operations of 1520 may be performed by a parameterized codebook component 825 as described with reference to FIG. 8.

The following provides an overview of aspects of the present disclosure:

Aspect 1: A method for wireless communications at a network entity, comprising: receiving a first indication of a set of codebooks associated with communication using a RIS, the first indication indicating a respective set of parameters associated with each codebook of the set of codebooks comprising at least one of a respective FOV associated with the codebook or a respective duration to switch between using different codewords of the codebook; transmitting, to a controller associated with the RIS, a second indication of a first codebook of the set of codebooks and a codeword of the first codebook based at least in part on a set of parameters associated with the first codebook; and communicating one or more messages using the RIS in accordance with the codeword.

Aspect 2: The method of aspect 1, further comprising: selecting the first codebook from the set of codebooks based at least in part on the set of parameters satisfying one or more thresholds, wherein the set of parameters satisfying the one or more thresholds comprises a FOV associated with the first codebook satisfying a threshold FOV, one or more gains associated with the FOV satisfying one or more threshold gains, a duration to switch between using different codewords of the first codebook satisfying a threshold duration, or a combination thereof, wherein the second indication is transmitted based at least in part on the selecting.

Aspect 3: The method of aspect 2, wherein the one or more gains associated with the FOV comprise an average gain, a five-percentile gain, or a combination thereof.

Aspect 4: The method of any of aspects 1 through 3, wherein receiving the first indication of the set of codebooks comprises: receiving the first indication of the set of codebooks from an OAM entity, a second network entity, or a controller associated with the RIS.

Aspect 5: The method of any of aspects 1 through 4, wherein the first indication of the set of codebooks comprises a respective set of identifiers for each codebook of the set of codebooks, the respective set of identifiers comprising at least one of a first identifier indicating the respective FOV associated with the codebook, a second identifier indicating the respective duration to switch between using different codewords of the codebook, or a third identifier indicating a respective gain associated with the respective FOV.

Aspect 6: The method of any of aspects 1 through 5, wherein the set of codebooks corresponds to at least one of a first incident signal direction from the network entity to the RIS or a first distance between the network entity and the RIS, and the set of codebooks is different from a second set of codebooks that corresponds to at least one of a second incident signal direction from a second network entity to the RIS or a second distance between the second network entity and the RIS.

Aspect 7: The method of any of aspects 1 through 6, wherein the second indication indicates a subset of codewords of the first codebook that comprises the codeword, and wherein communicating the one or more messages using the RIS comprises: transmitting, using the RIS, a set of SSBs in accordance with the subset of codewords.

Aspect 8: The method of aspect 7, further comprising: receiving, from a UE, a report indicating a preferred SSB from the set of SSBs based at least in part on transmitting the set of SSBs; and communicating one or more second messages with the UE using the RIS based at least in part on the report.

Aspect 9: The method of aspect 8, further comprising: classifying, based at least in part on the report, the UE for coverage by the network entity using the RIS, wherein the one or more second messages are communicated with the UE based at least in part on the classifying.

Aspect 10: The method of any of aspects 1 through 9, wherein the first indication indicates the respective FOV associated with the codebook as an angular span comprising an azimuth and an elevation.

Aspect 11: The method of any of aspects 1 through 10, wherein the respective duration to switch between using different codewords of the codebook comprises a maximum duration for the RIS to switch between using any two codewords of the codebook.

Aspect 12: A method for wireless communication at a network entity, comprising: transmitting, to a controller associated with a RIS, a first indication of a first set of parameters associated with a first codebook for communication using the RIS; and receiving, from the controller based at least in on part on transmitting the first indication, a second indication of a second codebook for the communication using the RIS, the second codebook associated with a second set of parameters that is based at least in part on the first set of parameters.

Aspect 13: The method of aspect 12, further comprising: transmitting, to the controller associated with the RIS, a third indication of the second codebook based at least in part on the second set of parameters associated with the second codebook satisfying one or more thresholds; and communicating one or more messages using the RIS in accordance with the second codebook.

Aspect 14: The method of aspect 13, wherein the one or more thresholds are based at least in part on one or more channel conditions associated with the network entity, traffic associated with the network entity, one or more user profiles associated with the network entity, or a combination thereof.

Aspect 15: The method of aspect 12, further comprising: transmitting, to the controller associated with the RIS, a third indication of a third set of parameters associated with a third codebook for the communication using the RIS based at least in part on the second set of parameters failing to satisfy one or more thresholds; and receiving, from the controller based at least in on part on transmitting the third indication, a fourth indication of a fourth codebook for the communication using the RIS, the fourth codebook associated with a fourth set of parameters that is based at least in part on the third set of parameters.

Aspect 16: The method of aspect 15, wherein the third set of parameters comprises at least one of: a FOV associated with the third codebook; one or more gains associated with the FOV; a duration to switch between using different codewords of the third codebook; an incident signal direction from the network entity to the RIS; a distance between the network entity and the RIS; a quantity of codewords included in the third codebook; or a set of reflect or refract angles from the RIS to respective UEs and respective distance ranges associated with each angle of the set of angles, each respective distance range corresponding to one or more expected distances from the RIS to a UE at each angle.

Aspect 17: The method of any of aspects 15 through 16, further comprising: updating the first set of parameters to the third set of parameters based at least in part on the second set of parameters failing to satisfy the one or more thresholds, wherein the third indication is transmitted based at least in part on the updating.

Aspect 18: The method of aspect 17, further comprising: adjusting a set of UEs associated with the communication using the RIS, wherein updating the first set of parameters to the third set of parameters is based at least in part on the adjusting.

Aspect 19: The method of any of aspects 15 through 18, wherein the one or more thresholds are based at least in part on one or more channel conditions associated with the network entity, traffic associated with the network entity, one or more user profiles associated with the network entity, or a combination thereof.

Aspect 20: The method of any of aspects 12 through 19, wherein the second indication indicates a set of codebooks for the communication using the RIS comprising the second codebook, each codebook of the set of codebooks associated with a respective set of parameters that is based at least in part on the first set of parameters.

Aspect 21: The method of aspect 20, further comprising: selecting the second codebook based at least in part on the second set of parameters satisfying one or more thresholds, wherein the second set of parameters satisfying the one or more thresholds comprises a FOV associated with the second codebook satisfying a threshold FOV, one or more gains associated with the FOV satisfying one or more threshold gains, a duration to switch between using different codewords of the second codebook satisfying a threshold duration, or a combination thereof; transmitting, to the controller associated with the RIS, a third indication of the second codebook and one or more codewords of the second codebook based at least in part on the selecting; and communicating one or more messages using the RIS in accordance with the one or more codewords.

Aspect 22: The method of any of aspects 12 through 21, wherein the first indication comprises a request for the controller associated with the RIS to generate the second codebook based at least in part on the first set of parameters, receiving the second indication of the second codebook is based at least in part on the request.

Aspect 23: The method of any of aspects 12 through 22, wherein the second indication of the second codebook comprises a set of identifiers for the second codebook, the set of identifiers comprising at least one of a first identifier indicating a FOV associated with the second codebook, a second identifier indicating a duration to switch between using different codewords of the second codebook, or a third identifier indicating a gain associated with the FOV.

Aspect 24: The method of any of aspects 12 through 23, wherein the first set of parameters comprises at least one of: a first FOV associated with the first codebook; one or more first gains associated with the first FOV; a first duration to switch between using different codewords of the first codebook; an incident signal direction from the network entity to the RIS; a distance between the network entity and the RIS; a first quantity of codewords included in the first codebook; or a set of reflect or refract angles from the RIS to respective UE) and respective distance ranges associated with each angle of the set of angles, each respective distance range corresponding to one or more expected distances from the RIS to a UE at each angle, and the second set of parameters comprises at least one of a second FOV associated with the second codebook; one or more second gains associated with the second FOV, a second duration to switch between using different codewords of the second codebook, or a second quantity of codewords included in the second codebook.

Aspect 25: The method of aspect 24, wherein the one or more first gains associated with the first FOV comprise a first average gain, a first five-percentile gain, or a combination thereof, and the one or more second gains associated with the second FOV comprise a second average gain, a second five-percentile gain, or a combination thereof.

Aspect 26: The method of any of aspects 24 through 25, wherein the first FOV is indicated as a first angular span comprising a first azimuth and a first elevation, and the second FOV is indicated as a second angular span comprising a second azimuth and a second elevation.

Aspect 27: The method of any of aspects 24 through 26, wherein the first duration to switch between using different codewords of the first codebook comprises a maximum duration for the RIS to switch between using any two codewords of the first codebook, and the second duration to switch between using different codewords of the second codebook comprises a maximum duration for the RIS to switch between using any two codewords of the second codebook.

Aspect 28: The method of any of aspects 12 through 27, further comprising: transmitting, to the controller associated with the RIS based at least in part on the second set of parameters, a third indication of the second codebook and a subset of codewords of the second codebook; and transmitting, using the RIS, a set of SSBs in accordance with the subset of codewords.

Aspect 29: The method of any of aspects 12 through 28, wherein the controller associated with the RIS is included in a second network entity.

Aspect 30: An apparatus for wireless communication at a network entity, comprising one or more memories storing processor-executable code; and one or more processors coupled with the one or more memories and individually or collectively operable to execute the code to cause the apparatus to perform a method of any of aspects 1 through 11.

Aspect 31: An apparatus for wireless communication at a network entity, comprising at least one means for performing a method of any of aspects 1 through 11.

Aspect 32: A non-transitory computer-readable medium storing code for wireless communication, the code comprising instructions executable by one or more processors to perform a method of any of aspects 1 through 11.

Aspect 33: An apparatus for wireless communication at a network entity, comprising one or more memories storing processor-executable code; and one or more processors coupled with the one or more memories and individually or collectively operable to execute the code to cause the apparatus to perform a method of any of aspects 12 through 29.

Aspect 34: An apparatus for wireless communication at a network entity, comprising at least one means for performing a method of any of aspects 12 through 29.

Aspect 35: A non-transitory computer-readable medium storing code for wireless communication, the code comprising instructions executable by one or more processors to perform a method of any of aspects 12 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A network entity for wireless communication, comprising:
   one or more memories storing processor-executable code; and
   one or more processors coupled with the one or more memories and individually or collectively operable to execute the code to cause the network entity to:
      receive a first indication of a set of codebooks associated with communication using a reconfigurable intelligent surface, the first indication indicating a respective set of parameters associated with each codebook of the set of codebooks comprising at least one of a respective field of view associated with the codebook or a respective duration to switch between using different codewords of the codebook;
      transmit, to a controller associated with the reconfigurable intelligent surface, a second indication of a first codebook of the set of codebooks and a codeword of the first codebook based at least in part on a set of parameters associated with the first codebook; and
      communicate one or more messages using the reconfigurable intelligent surface in accordance with the codeword.

2. The network entity of claim 1, wherein the one or more processors are individually or collectively operable to execute the code to cause the network entity to:
   select the first codebook from the set of codebooks based at least in part on the set of parameters satisfying one or more thresholds, wherein the set of parameters satisfying the one or more thresholds comprises a field of view associated with the first codebook satisfying a threshold field of view, one or more gains associated with the field of view satisfying one or more threshold gains, a duration to switch between using different codewords of the first codebook satisfying a threshold duration, or a combination thereof,
   wherein the second indication is transmitted based at least in part on the selecting.

3. The network entity of claim 2, wherein the one or more gains associated with the field of view comprise an average gain, a five-percentile gain, or a combination thereof.

4. The network entity of claim 1, wherein, to receive the first indication of the set of codebooks, the one or more processors are individually or collectively operable to execute the code to cause the network entity to:
receive the first indication of the set of codebooks from an operations, administration, and maintenance (OAM) entity, a second network entity, or a controller associated with the reconfigurable intelligent surface.

5. The network entity of claim 1, wherein the first indication of the set of codebooks comprises a respective set of identifiers for each codebook of the set of codebooks, the respective set of identifiers comprising at least one of a first identifier indicating the respective field of view associated with the codebook, a second identifier indicating the respective duration to switch between using different codewords of the codebook, or a third identifier indicating a respective gain associated with the respective field of view.

6. The network entity of claim 1, wherein:
the set of codebooks corresponds to at least one of a first incident signal direction from the network entity to the reconfigurable intelligent surface or a first distance between the network entity and the reconfigurable intelligent surface, and
the set of codebooks is different from a second set of codebooks that corresponds to at least one of a second incident signal direction from a second network entity to the reconfigurable intelligent surface or a second distance between the second network entity and the reconfigurable intelligent surface.

7. The network entity of claim 1, wherein the second indication indicates a subset of codewords of the first codebook that comprises the codeword, and wherein, to communicate the one or more messages using the reconfigurable intelligent surface, the one or more processors are individually or collectively operable to execute the code to cause the network entity to:
transmit, using the reconfigurable intelligent surface, a set of synchronization signal blocks in accordance with the subset of codewords.

8. The network entity of claim 7, wherein the one or more processors are individually or collectively operable to execute the code to cause the network entity to:
receive, from a user equipment (UE), a report indicating a preferred synchronization signal block from the set of synchronization signal blocks based at least in part on transmitting the set of synchronization signal blocks; and
communicate one or more second messages with the UE using the reconfigurable intelligent surface based at least in part on the report.

9. The network entity of claim 8, wherein the one or more processors are individually or collectively operable to execute the code to cause the network entity to:
classify, based at least in part on the report, the UE for coverage by the network entity using the reconfigurable intelligent surface, wherein the one or more second messages are communicated with the UE based at least in part on the classifying.

10. The network entity of claim 1, wherein the first indication indicates the respective field of view associated with the codebook as an angular span comprising an azimuth and an elevation.

11. The network entity of claim 1, wherein the respective duration to switch between using different codewords of the codebook comprises a maximum duration for the reconfigurable intelligent surface to switch between using any two codewords of the codebook.

12. An network entity for wireless communication at a network entity, comprising:
one or more memories storing processor-executable code; and
one or more processors coupled with the one or more memories, the one or more processors individually or collectively operable to execute the code to cause the network entity to:
transmit, to a controller associated with a reconfigurable intelligent surface, a first indication of a first set of parameters associated with a first codebook for communication using the reconfigurable intelligent surface; and
receive, from the controller based at least in part on transmitting the first indication, a second indication of a second codebook for the communication using the reconfigurable intelligent surface, the second codebook associated with a second set of parameters that is based at least in part on the first set of parameters.

13. The network entity of claim 12, wherein the one or more processors are individually or collectively operable to execute the code to cause the network entity to:
transmit, to the controller associated with the reconfigurable intelligent surface, a third indication of the second codebook based at least in part on the second set of parameters associated with the second codebook satisfying one or more thresholds; and
communicate one or more messages using the reconfigurable intelligent surface in accordance with the second codebook.

14. The network entity of claim 13, wherein the one or more thresholds are based at least in part on one or more channel conditions associated with the network entity, traffic associated with the network entity, one or more user profiles associated with the network entity, or a combination thereof.

15. The network entity of claim 12, wherein the one or more processors are individually or collectively operable to execute the code to cause the network entity to:
transmit, to the controller associated with the reconfigurable intelligent surface, a third indication of a third set of parameters associated with a third codebook for the communication using the reconfigurable intelligent surface based at least in part on the second set of parameters failing to satisfy one or more thresholds; and
receive, from the controller based at least in part on transmitting the third indication, a fourth indication of a fourth codebook for the communication using the reconfigurable intelligent surface, the fourth codebook associated with a fourth set of parameters that is based at least in part on the third set of parameters.

16. The network entity of claim 15, wherein the third set of parameters comprises at least one of: a field of view associated with the third codebook; one or more gains associated with the field of view; a duration to switch between using different codewords of the third codebook; an incident signal direction from the network entity to the reconfigurable intelligent surface; a distance between the network entity and the reconfigurable intelligent surface; a quantity of codewords included in the third codebook; or a set of reflect or refract angles from the reconfigurable intelligent surface to respective user equipment (UEs) and respective distance ranges associated with each angle of the set of angles, each respective distance range corresponding to one or more expected distances from the reconfigurable intelligent surface to a UE at each angle.

17. The network entity of claim 15, wherein the one or more processors are individually or collectively operable to execute the code to cause the network entity to:
update the first set of parameters to the third set of parameters based at least in part on the second set of parameters failing to satisfy the one or more thresholds, wherein the third indication is transmitted based at least in part on the updating.

18. The network entity of claim 17, wherein the one or more processors are individually or collectively operable to execute the code to cause the network entity to:
adjust a set of user equipment (UEs) associated with the communication using the reconfigurable intelligent surface, wherein updating the first set of parameters to the third set of parameters is based at least in part on the adjusting.

19. The network entity of claim 15, wherein the one or more thresholds are based at least in part on one or more channel conditions associated with the network entity, traffic associated with the network entity, one or more user profiles associated with the network entity, or a combination thereof.

20. The network entity of claim 12, wherein the second indication indicates a set of codebooks for the communication using the reconfigurable intelligent surface comprising the second codebook, each codebook of the set of codebooks associated with a respective set of parameters that is based at least in part on the first set of parameters.

21. The network entity of claim 20, wherein the one or more processors are individually or collectively operable to execute the code to cause the network entity to:
select the second codebook based at least in part on the second set of parameters satisfying one or more thresholds, wherein the second set of parameters satisfying the one or more thresholds comprises a field of view associated with the second codebook satisfying a threshold field of view, one or more gains associated with the field of view satisfying one or more threshold gains, a duration to switch between using different codewords of the second codebook satisfying a threshold duration, or a combination thereof;
transmit, to the controller associated with the reconfigurable intelligent surface, a third indication of the second codebook and one or more codewords of the second codebook based at least in part on the selecting; and
communicate one or more messages using the reconfigurable intelligent surface in accordance with the one or more codewords.

22. The network entity of claim 12, wherein:
the first indication comprises a request for the controller associated with the reconfigurable intelligent surface to generate the second codebook based at least in part on the first set of parameters, and
receiving the second indication of the second codebook is based at least in part on the request.

23. The network entity of claim 12, wherein the second indication of the second codebook comprises a set of identifiers for the second codebook, the set of identifiers comprising at least one of a first identifier indicating a field of view associated with the second codebook, a second identifier indicating a duration to switch between using different codewords of the second codebook, or a third identifier indicating a gain associated with the field of view.

24. The network entity of claim 12, wherein:
the first set of parameters comprises at least one of: a first field of view associated with the first codebook; one or more first gains associated with the first field of view; a first duration to switch between using different codewords of the first codebook; an incident signal direction from the network entity to the reconfigurable intelligent surface; a distance between the network entity and the reconfigurable intelligent surface; a first quantity of codewords included in the first codebook; or a set of reflect or refract angles from the reconfigurable intelligent surface to respective user equipment (UEs) and respective distance ranges associated with each angle of the set of angles, each respective distance range corresponding to one or more expected distances from the reconfigurable intelligent surface to a UE at each angle, and
the second set of parameters comprises at least one of a second field of view associated with the second codebook; one or more second gains associated with the second field of view, a second duration to switch between using different codewords of the second codebook, or a second quantity of codewords included in the second codebook.

25. The network entity of claim 24, wherein:
the one or more first gains associated with the first field of view comprise a first average gain, a first five-percentile gain, or a combination thereof, and
the one or more second gains associated with the second field of view comprise a second average gain, a second five-percentile gain, or a combination thereof.

26. The network entity of claim 24, wherein:
the first field of view is indicated as a first angular span comprising a first azimuth and a first elevation, and
the second field of view is indicated as a second angular span comprising a second azimuth and a second elevation.

27. The network entity of claim 24, wherein:
the first duration to switch between using different codewords of the first codebook comprises a maximum duration for the reconfigurable intelligent surface to switch between using any two codewords of the first codebook, and
the second duration to switch between using different codewords of the second codebook comprises a maximum duration for the reconfigurable intelligent surface to switch between using any two codewords of the second codebook.

28. The network entity of claim 12, wherein the one or more processors are individually or collectively operable to execute the code to cause the network entity to:
transmit, to the controller associated with the reconfigurable intelligent surface based at least in part on the second set of parameters, a third indication of the second codebook and a subset of codewords of the second codebook; and
transmit, using the reconfigurable intelligent surface, a set of synchronization signal blocks in accordance with the subset of codewords.

29. A method for wireless communication by a network entity, comprising:
receiving a first indication of a set of codebooks associated with communication using a reconfigurable intelligent surface, the first indication indicating a respective set of parameters associated with each codebook of the set of codebooks comprising at least one of a respective field of view associated with the codebook or a respective duration to switch between using different codewords of the codebook;

transmitting, to a controller associated with the reconfigurable intelligent surface, a second indication of a first codebook of the set of codebooks and a codeword of the first codebook based at least in part on a set of parameters associated with the first codebook; and communicating one or more messages using the reconfigurable intelligent surface in accordance with the codeword.

30. A method for wireless communication by a network entity, comprising:

transmitting, to a controller associated with a reconfigurable intelligent surface, a first indication of a first set of parameters associated with a first codebook for communication using the reconfigurable intelligent surface; and receiving, from the controller based at least in part on transmitting the first indication, a second indication of a second codebook for the communication using the reconfigurable intelligent surface, the second codebook associated with a second set of parameters that is based at least in part on the first set of parameters.

* * * * *